US011898591B2

(12) United States Patent
Mullin et al.

(10) Patent No.: US 11,898,591 B2
(45) Date of Patent: Feb. 13, 2024

(54) RELEASABLE COUPLING DEVICE

(71) Applicant: Make Ideas, LLC, La Jolla, CA (US)

(72) Inventors: Keith Mullin, La Jolla, CA (US);
Christopher Taddei, Carlsbad, CA (US)

(73) Assignee: Make Ideas, LLC, La Jolla, CA (US)

( * ) Notice: Subject to any disclaimer, the term of this patent is extended or adjusted under 35 U.S.C. 154(b) by 0 days.

(21) Appl. No.: 17/897,136

(22) Filed: Aug. 27, 2022

(65) Prior Publication Data

US 2023/0061741 A1 Mar. 2, 2023

Related U.S. Application Data

(60) Provisional application No. 63/238,166, filed on Aug. 29, 2021.

(30) Foreign Application Priority Data

Aug. 22, 2022 (GB) ..................................... 2212194

(51) Int. Cl.
*F16B 45/04* (2006.01)
*A01K 27/00* (2006.01)
*F16B 45/00* (2006.01)

(52) U.S. Cl.
CPC .......... *F16B 45/055* (2021.05); *A01K 27/005* (2013.01); *F16B 45/002* (2021.05)

(58) Field of Classification Search
CPC ...... F16B 45/04; F16B 45/055; F16B 45/002; A01K 27/005
See application file for complete search history.

(56) References Cited

U.S. PATENT DOCUMENTS

| 186,637 A | 1/1877 | Tanner |
| 275,537 A | 4/1883 | Straw |
| 302,509 A | 7/1884 | Mauthner |
| (Continued) | | |

FOREIGN PATENT DOCUMENTS

WO 2020097584 A1 5/2020

OTHER PUBLICATIONS

"International Search Report" and "Written Opinion of the International Search Authority" (ISA/US) in Make Ideas, LLC, International Patent Application Serial No. PCT/US2019/060647, dated Jan. 30, 2020 (7 pages).

(Continued)

*Primary Examiner* — Robert Sandy
*Assistant Examiner* — Louis A Mercado
(74) *Attorney, Agent, or Firm* — Tillman, Wright & Wolgin; James D. Wright; David R. Higgins

(57) ABSTRACT

A releasable coupling device for use with a pet includes a body, having an aperture, and a sleeve that is positioned at least partially around, and moveable relative to, at least a portion of the body. The sleeve is moveable between an open position in which at least a portion of the aperture is at least partially unoccluded so as to permit coupling of the device to an attachment receivable within the aperture, and a closed position in which at least a portion of the aperture is at least partially occluded so as to resist decoupling of the device by removal of an attachment from the aperture. The device defines a track configured to guide an attachment receivable within the aperture along a movement path.

18 Claims, 23 Drawing Sheets

(56) References Cited

U.S. PATENT DOCUMENTS

| | | | | |
|---|---|---|---|---|
| 370,918 | A | * | 10/1887 | Armstrong .............. F16G 15/02 54/54 |
| 582,564 | A | | 5/1897 | Weierbach |
| 731,162 | A | | 6/1903 | Carter |
| 828,823 | A | | 8/1906 | Maize |
| 831,260 | A | | 9/1906 | Borlaug et al. |
| 967,486 | A | * | 8/1910 | Avery .................. A44C 5/2028 267/74 |
| 1,062,653 | A | | 5/1913 | Koons |
| 2,530,518 | A | * | 11/1950 | Lloyd ...................... B66C 1/36 24/600.6 |
| 2,826,798 | A | * | 3/1958 | Kahl ..................... F16B 21/125 24/600.8 |
| 3,365,759 | A | * | 1/1968 | Molzan ................. B64D 17/38 24/598.9 |
| 3,861,007 | A | | 1/1975 | Silverman |
| 3,988,813 | A | * | 11/1976 | Korcey, Jr. .......... A44C 5/2019 24/DIG. 34 |
| 4,277,866 | A | | 7/1981 | Song |
| 4,419,874 | A | * | 12/1983 | Brentini ................. A44B 15/00 70/459 |
| 4,930,194 | A | | 6/1990 | Frechin |
| 4,977,647 | A | | 12/1990 | Casebolt |
| 5,156,430 | A | | 10/1992 | Mori |
| 5,608,953 | A | | 3/1997 | Petzl et al. |
| 5,791,025 | A | | 8/1998 | Maurice et al. |
| 6,360,408 | B1 | | 3/2002 | Dykstra et al. |
| 6,401,312 | B1 | * | 6/2002 | Wang ...................... F16B 45/04 24/598.7 |
| 6,588,076 | B1 | | 7/2003 | Choate |
| 7,124,479 | B2 | | 10/2006 | Johnson |
| 7,752,721 | B2 | * | 7/2010 | Lin ........................ F16B 45/04 24/600.6 |
| 8,015,676 | B1 | | 9/2011 | Choate |
| 8,276,247 | B2 | | 10/2012 | Yang |
| 10,066,660 | B2 | | 9/2018 | Henn et al. |
| 2007/0261210 | A1 | | 11/2007 | Chen |
| 2008/0104810 | A1 | | 5/2008 | Liang |

OTHER PUBLICATIONS

"International Preliminary Report" and "Written Opinion of the International Search Authority" (ISA/US) in Make Ideas, LLC, International Patent Application Serial No. PCT/US2019/060647, dated May 20, 2021 (6 pages).

Bolt Snap, Wikipedia, Retrieved from "https://en.wikipedia.org/w/index.php?title=Bolt_snap&oldid=922363000", accessed Feb. 3, 2020, (4 pages).

"International Search Report" and "Written Opinion of the International Search Authority" (ISA/EPO) in Make Ideas, LLC, International Patent Application Serial No. PCT/US2022/041778, dated Nov. 23, 2022 (14 pages).

* cited by examiner

|  | P1 | | P2 | | P3 | |
|---|---|---|---|---|---|---|
|  | x0 | y0 | x1 | y1 | x2 | y2 |
| Eq 1 (B1) | 328 | 43 | 332 | 47 | 344 | 58 |
| Eq 2 (B2) | 352 | 65 | 371 | 94 | 376 | 108 |
| Eq 3 (B3) | 382 | 124 | 396 | 166 | 392 | 180 |
| Eq 4 (B4) | 388 | 194 | 379 | 201 | 355 | 215 |
| Eq 5 (B5) | 341 | 223 | 309 | 232 | 293 | 229 |
| Eq 6 (B6) | 278 | 226 | 270 | 225 | 256 | 218 |
| Eq 7 (B7) | 243 | 211 | 249 | 214 | 232 | 201 |
| Eq 8 (B8) | 215 | 188 | 219 | 187 | 204 | 187 |
| Eq 9 (B9) | 176 | 187 | 150 | 193 | 112 | 195 |
| Eq 10 (B10) | 88 | 196 | 79 | 199 | 47 | 176 |
| Eq 11 (B11) | 34 | 167 | 23 | 142 | 21 | 127 |
| Eq 12 (B12) | 19 | 111 | 24 | 91 | 28 | 84 |
| Eq 13 (B13) | 35 | 71 | 43 | 59 | 60 | 49 |
| Eq 14 (B14) | 72 | 42 | 79 | 40 | 94 | 39 |
| Eq 15 (B15) | 121 | 37 | 325 | 38 | 310 | 38 |

Figure 16

$B1x(t) = 328(1 - t)^2 + 2 \times 332(1 - t)t + 344t^2$
$B1y(t) = 43(1 - t)^2 + 2 \times 47(1 - t)t + 58t^2$
$B2x(t) = 352(1 - t)^2 + 2 \times 371(1 - t)t + 376t^2$
$B2y(t) = 65(1 - t)^2 + 2 \times 94(1 - t)t + 108t^2$
$B3x(t) = 382(1 - t)^2 + 2 \times 396(1 - t)t + 392t^2$
$B3y(t) = 124(1 - t)^2 + 2 \times 166(1 - t)t + 180t^2$
$B4x(t) = 388(1 - t)^2 + 2 \times 379(1 - t)t + 355t^2$
$B4y(t) = 194(1 - t)^2 + 2 \times 201(1 - t)t + 215t^2$
$B5x(t) = 341(1 - t)^2 + 2 \times 309(1 - t)t + 293t^2$
$B5y(t) = 223(1 - t)^2 + 2 \times 232(1 - t)t + 229t^2$
$B6x(t) = 278(1 - t)^2 + 2 \times 270(1 - t)t + 256t^2$
$B6y(t) = 226(1 - t)^2 + 2 \times 225(1 - t)t + 218t^2$
$B7x(t) = 243(1 - t)^2 + 2 \times 249(1 - t)t + 232t^2$
$B7y(t) = 211(1 - t)^2 + 2 \times 214(1 - t)t + 201t^2$
$B8x(t) = 215(1 - t)^2 + 2 \times 219(1 - t)t + 204t^2$
$B8y(t) = 188(1 - t)^2 + 2 \times 187(1 - t)t + 187t^2$
$B9x(t) = 176(1 - t)^2 + 2 \times 150(1 - t)t + 112t^2$
$B9y(t) = 187(1 - t)^2 + 2 \times 193(1 - t)t + 195t^2$
$B10x(t) = 88(1 - t)^2 + 2 \times 79(1 - t)t + 47t^2$
$B10y(t) = 196(1 - t)^2 + 2 \times 199(1 - t)t + 176t^2$
$B11x(t) = 34(1 - t)^2 + 2 \times 23(1 - t)t + 21t^2$
$B11y(t) = 167(1 - t)^2 + 2 \times 142(1 - t)t + 127t^2$
$B12x(t) = 19(1 - t)^2 + 2 \times 24(1 - t)t + 28t^2$
$B12y(t) = 111(1 - t)^2 + 2 \times 91(1 - t)t + 84t^2$
$B13x(t) = 35(1 - t)^2 + 2 \times 43(1 - t)t + 60t^2$
$B13y(t) = 71(1 - t)^2 + 2 \times 59(1 - t)t + 49t^2$
$B14x(t) = 72(1 - t)^2 + 2 \times 79(1 - t)t + 94t^2$
$B14y(t) = 42(1 - t)^2 + 2 \times 40(1 - t)t + 39t^2$
$B15x(t) = 121(1 - t)^2 + 2 \times 325(1 - t)t + 310t^2$
$B15y(t) = 37(1 - t)^2 + 2 \times 38(1 - t)t + 38t^2$

Figure 18

RELEASABLE COUPLING DEVICE

CROSS REFERENCE TO RELATED APPLICATIONS

The present application is a U.S. nonprovisional patent application of, and claims priority under 35 U.S.C. § 119(e) to, U.S. provisional patent application Ser. No. 63/238,166, filed Aug. 29, 2021, which '166 application is incorporated herein by reference in its entirety, and the present application claims the benefit of United Kingdom Patent Application No. GB 2212194.1, filed Aug. 22, 2022, which '194.1 application, the application publication thereof, and any patent issuing therefrom are each incorporated herein by reference in their respective entireties, and which '194.1 application claims the benefit of U.S. provisional patent application Ser. No. 63/238,166, filed Aug. 29, 2021.

FIELD OF THE DISCLOSURE

The present disclosure relates to a releasable coupling device.

The releasable coupling device is suitable for releasable coupling a first device or object or apparatus and a second device or object or apparatus.

The releasable coupling device is suitable for a wide variety of uses in a wide variety of environments/activities/industries.

One example use is for coupling a lead or leash to an animal collar, halter, headcollar or harness to restrain, control, guide an animal, for example a pet.

Other example uses include numerous applications in the fields of sailing, climbing, sports, and other fields requiring a device for releasably coupling two devices or objects or apparatuses together.

BACKGROUND TO THE DISCLOSURE

Snap hooks, snap bolts, 'P' clips, trigger clips, trigger hooks and other devices of this nature are widely known and used. In particular, these known devices are commonly used in the fields of sailing, climbing and other fields requiring hardware for fastening two objects together. They are also used in the pet industry to connect a lead or leash to a ring on an animal collar, halter, headcollar or harness.

Other uses of snap bolts and snap hooks might also include connecting any two devices or objects or apparatuses together, where one device has a snap bolt or hook attached to it, and the other a receiving ring, or in some cases each device has a receiving ring or similar receiving item and a double ended snap hook or bolt is used to connect the two items together.

A typical arrangement of a trigger clip, 'P' clip, snap hook and snap bolt clip, is shown in FIGS. 1a to 1c. FIG. 1a is a perspective view of a leash 2 having a conventional swivel-eye bolt snap device 4 or otherwise known as a trigger clip or 'P' clip, connected to a collar, halter or harness 6 via a ring 8. FIGS. 1b and 1c are enlarged perspective views of FIG. 1a.

The devices of the prior art as illustrated in FIGS. 1a to 1c are opened via a thumb latch 10. Once the device 4 is in an open position as shown in FIG. 1c the device 4 is manoeuvred so that the ring 8 is positioned within the capture area or eyehole 12. Once the ring 8 is captured within the eyehole 12 of the device 4, the thumb latch 10 is released thus moving the latch/bolt/closing a gate so that the device 4 is attached to the ring 8 as shown in FIG. 1b.

A limitation of known snap bolt and hook devices is their ability to withstand significant tensile forces.

In light of this and other limitations, the present inventors have previously sought to improve known 'P' clips and trigger clips mentioned above with reference to FIGS. 1a to 1c. The present inventors have previously developed the snap-sleeve hook device disclosed in published international patent application WO 2020/097584 A1.

WO '584 discloses a snap-sleeve hook device for use with pets and includes an elongated bolt and a structural retaining sleeve system. The bolt has a bolt body with an eye hole disposed at a distal end thereof and having an opening to a side of the bolt in a direction perpendicular to the bolt axis. The eye hole and distal end of the bolt body define a bolt hook. The sleeve system includes a spring and a sleeve that fits around the bolt body. The sleeve is forced by the spring toward the end of the bolt body and around the bolt hook to cover the eye hole opening. The sleeve is adjustable between a first position, wherein the sleeve fully closes the opening to the eye hole, and a second position, wherein the sleeve is retracted against the force of the spring to uncover the opening to the eye hole.

The present inventors have since appreciated that the snap-sleeve hook device disclosed in WO'584 is not optimised. For example, in certain scenarios, the device of WO'584 may be prone to being accidently opened or released during use. Where the device is used to couple a lead or leash to an animal collar, halter or harness, such accidental release may lead to a risk of harm to the animal, the person leading the animal or another person.

The inventors have therefore appreciated a need for an improved releasable coupling device which may be less prone to being accidently opened or released during use.

SUMMARY OF THE DISCLOSURE

The present disclosure provides a releasable coupling device as defined in the appended independent claims, to which reference should now be made.

Preferred or advantageous features of the disclosure are set out in the dependent claims, to which reference should now be made.

According to a first aspect of the present disclosure, there is provided a releasable coupling device comprising a body comprising an aperture and a sleeve positioned at least partially around, and moveable relative to, at least a portion of the body. The sleeve is moveable between an open position in which at least a portion of the aperture is at least partially unoccluded so as to permit coupling of the device to an attachment receivable within the aperture, and a closed position in which at least a portion of the aperture is at least partially occluded so as to resist decoupling of the of the device by removal of an attachment from the aperture. The device defines a track configured to guide an attachment receivable within the aperture along a movement path.

The body may alternatively be referred to as a bolt or core, or another analogous term.

The aperture may alternatively be referred to as an opening or recess or channel, or another analogous term.

The sleeve may alternatively be referred to as a slide, slider or collar, or another analogous term.

An attachment may alternatively be referred to as an object or device or item. In an example for the pet industry in which the device is used to couple a leash to an animal collar, halter, headcollar or harness to restrain, control, guide an animal, for example a pet, an attachment or object may be a ring, or loop, or D-ring or triangular ring coupled to an animal collar, halter, headcollar or harness.

In an example for the sailing and marine industry an attachment or object may be rigging, sheet, stay, tow hitch, rope, buoy or a hammock.

In an example for the aerospace industry an attachment or object may be a line, cord, stringer, stay line, aileron cable or forks.

In an example for the trucking and transportation industry an attachment or object may be tie-downs, tow hitches and cargo nets.

In an example for the outdoor sports industry an attachment or object may be back packs, climbing ropes, spikes and tents.

In an example for the health care industry an attachment or object may be a part of an IV-stand, cart or gurney.

The track may alternatively be referred to as a channel, path or guide, or another analogous term.

The sleeve is positioned at least partially around the body. It therefore need not extend around an entire periphery or cross section of the body. It may optionally extend only partially around a periphery or cross section of the body. It may therefore be, for example, a half-sleeve or partial sleeve that is movable relative to the body.

The device comprising a combination of a body and a sleeve, may be capable of withstanding higher tensile forces in multiple directions than some known snap hooks, snap bolts, 'P' clips, trigger clips, and trigger hooks.

The device may advantageously provide a releasable coupling device configured to resist or oppose decoupling of the device by removal of an attachment from the aperture.

In the closed position, the predefined or predetermined track of the releasable coupling device advantageously defines a predetermined path or movement path or guide path for an attachment receivable within the aperture. The track guides or influences the movement of an attachment or object into preferred areas, regions, or attachment-receiving regions, or zones, or lobes, or terminals of the track. These preferred regions are defined by the shape of the aperture and track. This may encourage an attachment receivable within the aperture to adopt or tend towards one or more preferred positions or regions of the aperture. Alternatively or additionally, it may discourage an attachment from adopting or remaining or sitting in a certain position or region of the track that may be prone to or cause, or may be more prone to or more likely to cause, unexpected decoupling or detachment of the releasable coupling device and an attachment in use of the device.

The device may reduce or eliminate a risk of accidental opening during use compared to some known devices. For example, the device may reduce or eliminate a risk of accidental opening during use in the event that a part of the device touches, twists relative to, brushes-up against, or otherwise engages with another object when in use. For example, the device may serve to resist or oppose movement of the sleeve, so as to resist or oppose removal of an attachment from the aperture, in the event that certain forces are applied to the device or in the event that a part of the device touches, twists relative to, brushes-up against, or otherwise engages with another object when in use.

The device may also resist or oppose forces created by twisting and/or turning and/or pulling and/or composite motions of the device relative to an object to which it may be removably coupled, for example an animal collar, halter, headcollar or harness coupled to a lead or leash by way of the device.

The device, in which the sleeve is positioned around, and moveable relative to, at least a portion the body and being moveable or slidable between an open and closed position, may provide a more secure means for holding an attachment positioned within the aperture and/or track because the sleeve and the body, when in a closed position, co-operate to envelop or surround or encapsulate or secure an attachment.

The device may provide an easily operable and user-friendly means for attaching the device to an attachment. For example, the sleeve positioned around at least a portion of the body and moveable between an open position and a closed position may provide a simple and effective means for coupling and decoupling the device to and from an attachment.

Optionally, the sleeve is slidable relative to the body between an open position and a closed position.

Optionally, the sleeve is slidable relative to a principal axis of the body.

Optionally, a sliding axis of the sleeve is substantially parallel to a principal axis of the body.

Optionally, the sleeve is slidable substantially along a principal axis of the body.

Optionally, a sliding axis of the sleeve is substantially co-incident with to a principal axis of the body.

Optionally, when in the closed position, the track is at least partially defined by a portion of the body and at least partially defined by a portion of the sleeve. This may advantageously provide a simple means for occluding and unoccluding the aperture such that the device can be coupled to an attachment. The track defining the predetermined movement path for an attachment may therefore be dependent on the configuration and/or shape of the aperture, the track, the body and the sleeve.

Optionally, the track comprises at least a first region, or first zone, or first recess, or first lobe or a first area configured to receive an attachment receivable within the aperture. This is advantageous, as the first region is a region within the track in which an attachment is configured to sit and/or be partially retained within when in use. The first region is a region of the track which the inventors have found to reduce the risk of unexpected decoupling when an attachment is positioned in that region of the track. Therefore, the track comprising a first region may in turn reduce the number of unexpected and undesirable decoupling between the device and an attachment.

Optionally, the first region is at least partially defined by the sleeve in the closed position. The first region may therefore be defined, in the closed position, by at least a portion of the body and by at least a portion the sleeve. In other words, when the sleeve is in a closed position a first region is defined within the track. This is advantageous as in the first region the force applied by an attachment may be distributed between the body and the sleeve.

Optionally, the track further comprises at least a second region, or second zone, or second recess, or second lobe, or second area configured to receive an attachment receivable within the aperture. The second region is a further region of the track which the inventors have found to reduce the risk of unexpected decoupling when an attachment is positioned in that region of the track. This may advantageously provide a further region within the track that is configured to receive an attachment.

Optionally, the first and second region may be configured such that an attachment receivable within the aperture is prone to remaining within, or encouraged to adopt, at least one of the first and second region. Therefore, regardless of the direction an attachment is being pulled and/or regardless of the type of force an attachment is subject to, the device is configured such that an attachment will most likely to sit within the first region or the second region of the track. This may further limit the risk or potential of spontaneous or unwanted decoupling of the device and an attachment.

Optionally, the track is configured to guide an attachment receivable within the aperture between the first region of the track and the second region of the track. The track may advantageously ensure that an attachment receivable within the aperture, in use, travels along the track and remains in, or adopts, either the first region of the track or the second region of the track. Whether an attachment sits within the first region or the second region may be dependent on the direction and/or nature and/or magnitude of the relative force(s) being applied to an attachment and the device.

Optionally, one or both of the first region and the second region is/are substantially continuously curved. At least one of the first region and the second region being substantially continuously curved may further assist in partially retaining an attachment in a first region or a second region of the track. Further, the curvature of the first region and the second region may be dependent on the curvature of the interior surface of the body and the sleeve. Continuously curved surfaces may advantageously reduce the number of high stress regions within the track.

A geometry of the first region and/or the second region and/or of the entire track may be defined by a set of composite Bézier curves and/or parametric equations.

Optionally, at least a portion of the track between the first region and the second region is non-linear. In other words, the movement path for an attachment between the first region of the track and the second region of the track is non-linear. The track between the first region and the second being non-linear advantageously means an attachment is more prone to sitting or remaining in one or other of the first or second regions, or moving from one region to the other, than it is to adopt another position along the track in between the first region and the second region. This may reduce the movement of an attachment within the track and/or define preferred positions for an attachment and/or discourage other positions for an attachment to adopt—for example a position proximate an entrance to the aperture. This may in turn reduce the likelihood of unexpected decoupling of the device and an attachment.

Optionally, the second region of the track may be defined at least partially by the body.

Optionally, the second region of the track may be defined at least by a hook portion of the body.

Optionally, the hook portion may be at or proximate a distal end of the body.

Optionally, the track comprises at least one step or protrusion between the first region and the second region. In other words, at least one step or protrusion is defined along the track. The step or protrusion may advantageously provide a partial obstacle between the first region and the second region of the track preventing excess movement between the two regions along the track and/or to discourage other positions for an attachment to adopt—for example a position proximate an entrance to the aperture.

Optionally, there may be more than one step or protrusion defined between the first and the second region.

Optionally, the step or projection is configured such that an attachment receivable within the aperture is encouraged towards the first region or the second region. The protrusion may be defined at a certain point within the track at which decoupling is most likely to occur. This may for example be a position proximate an entrance to the aperture. It may for example be proximate where the body and sleeve meet or overlap in the closed position. Therefore, the step or protrusion advantageously substantially prevents an attachment from applying force at the point at which the step or protrusion is situated. Instead, an attachment will be guided or encouraged away from the step or protrusion towards the first region or the second region of the track.

Optionally, at least a portion of a transition portion of the track between the first region and the second region comprises at least one inclined portion. This may serve to further encourage an attachment into the first region or the second region of the track.

Optionally, the track is configured so that the sleeve is auto-lockable or self-lockable by an attachment received within the aperture. This may serve to urge the sleeve into the closed position.

Optionally, the track is configured such that, in the closed position, in the event of a twisting or composite or complex motion of an attachment receivable with the aperture, the sleeve is urgeable by an attachment into the closed position. The shape and configuration of the track may ensure that, upon rotation and/or twisting of an attachment relative to the body, for example relative to a longitudinal axis of the body, an attachment remains constrained by the sleeve and the body. This may advantageously prevent an attachment from moving around the track and/or aperture and in turn causing undesired and/or accidental release of an attachment and the device.

Optionally, the first region and/or the second region is configured such that, in the closed position, in the event of a twisting or composite or complex motion of an attachment receivable with the aperture, the sleeve is urgeable by an attachment into the closed position. Due to the shape of the first region, the sleeve may remain in a closed position regardless of the motion of an attachment. In other words, the sleeve is self-locked or auto-locked in a closed position. This is advantageous as it may provide a releasable coupling device that better resists forces created by different motions such as twisting motions and even uses such motions to auto-lock or self-lock the sleeve in a closed position.

Optionally, a distal end of the body protrudes beyond a distal end of the sleeve when the sleeve is in a closed position.

Optionally, a distal end of the aperture and/or a distal end of the track protrudes beyond a distal end of the sleeve when the sleeve is in the closed position. This may advantageously provide an area within the aperture and/or track that can withstand high tensile forces and stresses.

Optionally, a distal end of the second region at least partially protrudes beyond a distal end of the sleeve when the sleeve is in the closed position. This may ensure that when an attachment is in the second region it is generally not in contact with the sleeve and/or not adjacent an entrance to the aperture and/or not adjacent where the body and sleeve meet or overlap in the closed position. This in turn, may advantageously reduce the number of unexpected decoupling from an attachment pushing on the sleeve.

Optionally, in the closed position, a distal end of the sleeve at least partially overlaps with a hook end of the body.

Optionally, a distal end of the sleeve, proximate the proximal end of the aperture, comprises one or more recessed or cutaway side portions. In other words, the distal end of the sleeve may comprise slots or cutaways or jaws in one or both of opposing sides of the sleeve.

Optionally, at least a portion of the recessed or cutaway opposing side portions is substantially continuously curved. The recessed or cutaway opposing side portions may be configured to receive at least a portion of an attachment. This may assist with the auto-locking or self-locking geometry of the device.

Optionally, in the closed position, at least a portion of the body may extend distally beyond at least a portion of at least one of the recessed or cutaway opposing side portions of the sleeve. This may assist with the auto-locking or self-locking geometry of the device.

Optionally, the releasable coupling device further comprises a resiliently deformable member configured to urge the sleeve into the closed position. Therefore, to move the sleeve towards the open position, a force opposite to and greater than the force of the resiliently deformable member must be applied to the sleeve. The resiliently deformable member is configured to move the slide back into a closed position upon the force being removed or being less than the spring force.

The releasable coupling device further comprising a resiliently deformable member may advantageously provide a means of ensuring the sleeve remains in the closed position unless the device is required to be in an open configuration or position in order to couple or decouple the device and an attachment. The resiliently deformable member advantageously prevents easy decoupling of the device and an attachment by preventing the sleeve from moving from a closed position to an open position unless it is desired—i.e., unless a deliberate opening action is performance.

Optionally, the resiliently deformable member is locatable within the body.

Optionally, the resiliently deformable member is a coiled spring. Advantageously, this may provide a simple and cost-effective means of urging the sleeve into the closed position and also allowing the sleeve to be moved from a closed position to an open position.

Further, the use of a coiled spring located within the body means that the user is not required to manually occlude the aperture themselves and/or manually move the sleeve from an open to closed position to retain an attachment. Instead, the sleeve automatically returns to a closed position upon the user releasing the sleeve. This is advantageous as it removes the potential of the user forgetting to return the device to its closed configuration which in turn could lead to undesirable decoupling caused by human error.

Optionally, the resiliently deformable member further comprises a slide positioned within, and slidable relative to, the body in contact with the spring.

The resiliently deformable member and the configuration of the sleeve may advantageously allow a user to carry out operation of the releasable coupling device with only one hand, thereby freeing the user's other hand for other functions.

Optionally, the body is of a metallic material or metal alloy. This may advantageously provide a body capable of resisting high forces and stresses. Other suitable materials will be appreciated by the skilled person such as a plastics or composite materials.

Optionally, the sleeve may be of a metallic material or metal alloy. Other suitable materials will be appreciated by the skilled person, such as a plastics or composite materials.

Optionally, the releasable coupling device may further comprise a swivel system or tail couplable to the body by a circlip or retaining ring at a proximal end of the body. This may allow the proximal end of the releasable coupling device to be attached to the distal end of a strap or other connected object that would be appreciated by the skilled person. This may advantageously increase the strength of the releasable coupling device by distributing tension loads over the body. The swivel system may advantageously allow rotation such that a strap or other connected object does not become twisted, tangled or deformed.

Optionally, the device comprises a lock for limiting or preventing movement of the sleeve and/or slide and/or resiliently deformable member. This is advantageous as it provides a further means for preventing the sleeve unexpectedly moving from a closed position to an open position or even a partially open position. Therefore, the likelihood of unanticipated decoupling of the device and an attachment is reduced.

The lock may be a latch, detent or lock system. In particular, such system may comprise a lock actuator and an additional spring, wherein the additional spring biases the lock actuator into a position abutting a surface of the sleeve and/or the slide and/or the resiliently deformable member such that the sleeve cannot move to an open position unless the actuator is depressed. Alternatively, a locking system may comprises be a detent device, a ball detent, or locking button, or a slidable or moveable locking pin, or resiliently deformable gate. Other suitable locking means will be known to the skilled person.

Additionally, the sleeve may comprise at least one gripped or gripping portion on an external surface. This may facilitate opening of the device to allow an attachment to be received within the aperture.

According to a second aspect of the present disclosure, there is provided an apparatus comprising at least one releasable coupling device according to the first aspect.

According to a third aspect of the present disclosure, there is provided an apparatus for an animal comprising at least one releasable coupling device according to the first aspect.

According to a fourth aspect of the present disclosure, there is provided a land, air or sea vehicle, or apparatus for a land, air or sea vehicle, comprising at least one releasable coupling device according to the first aspect.

According to a fifth aspect of the present disclosure, there is provided an apparatus for use in sports, climbing or other outdoor activity comprising at least one releasable coupling device according to the first aspect.

According to a sixth aspect of the present disclosure, there is provide an apparatus for use in the healthcare industry, comprising at least one releasable coupling device according to the first aspect.

According to a seventh aspect of the present disclosure, there is provided a kit of parts comprising at least one releasable coupling device according to the first aspect and at least one lead or leash for guiding an animal.

According to still another aspect of the present disclosure, there is provided a releasable coupling device that includes an elongated body and a structural retaining sleeve system. The elongated body includes an aperture, penetrating transversely through the elongated body, disposed at a distal end thereof and having an opening to a side of the elongated body in a direction generally perpendicular to a primary axis of the elongated body. The aperture and distal end of the elongated body define a hook. The structural retaining sleeve system includes a sleeve. The sleeve has an open distal end with slots opening toward the distal end, and the sleeve fits around the elongated body and is longitudinally adjustable between a closed position, wherein the sleeve is disposed around the hook, the slots are transversely aligned with the aperture, and the covering portion of the sleeve fully covers the opening to the aperture in the side of the elongated body, and an open position, wherein the sleeve is retracted to uncover the opening to the aperture in the side of the elongated body. In the closed position, a track is defined by the aperture and the slots such that when viewed from a side, the track includes at least two distinct regions or lobes, each defining a respective primary ring retention area, that are separated by a step or protrusion. An attachment may be inserted into the aperture while the sleeve is in the open position but retained in the track while the sleeve is in the closed position. While retained in the track while the sleeve is in the closed position, the attachment tends to remain in a particular one of the at least two regions or lobes thereof with the step or protrusion providing a physical obstacle to the attachment moving from the particular one of the at least two through-hole regions or lobes to another of the at least two through-hole regions or lobes.

In a feature of this aspect, a first region or lobe is defined primarily by inward-facing surfaces of the hook, and a second region or lobe has an end defined primarily by inwardly facing surfaces of the covering portion of the sleeve.

In another feature of this aspect, the step or protrusion is a distinctly protruding or convex surface.

In another feature of this aspect, the step or protrusion is arranged to help retain the attachment in the second region or lobe such that a pull force component exerted by the attachment in a direction toward the proximal end of the elongated body is resisted by the body, and a pull force component exerted by the attachment toward the opening to the aperture is resisted by the covering portion of the sleeve.

In another feature of this aspect, the step or protrusion is defined by surfaces of the covering portion of the sleeve.

In another feature of this aspect, the step or protrusion is defined by surfaces of the hook.

In another feature of this aspect, when viewed from a side, the track is "L"-shaped.

In another feature of this aspect, when viewed from a side, the track is "T"-shaped.

In another feature of this aspect, when viewed from a side, the track is generally curved in shape.

In another feature of this aspect, a shape and/or geometry of the track is defined in two-dimensional space using a set of cubic Bézier curves.

In another feature of this aspect, the structural retaining sleeve system further includes a spring, wherein the sleeve is biased by the spring toward the distal end of the elongated body and into the closed position such that the sleeve is disposed around the hook, and wherein the open position is reached by retracting the sleeve against the force of the spring.

In another feature of this aspect, the releasable coupling device further includes a swivel system at a proximal end of the elongated body.

Any feature in one aspect of the disclosure may be applied to other aspects of the disclosure, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the disclosure can be implemented and/or supplied and/or used independently.

BRIEF DESCRIPTION OF THE FIGURES

The disclosure will be further described, by way of example only, with reference to the accompanying drawings in which:

FIG. 16 is a tabular illustration of the control points for the shape of the particular opening shown in FIG. 17;

FIG. 18 is a list of the equations corresponding to the control points of FIG. 16;

Like reference numbers are used for like elements throughout the description and figures.

DESCRIPTION OF EXAMPLE EMBODIMENTS OF THE PRESENT DISCLOSURE

Figure 1A:
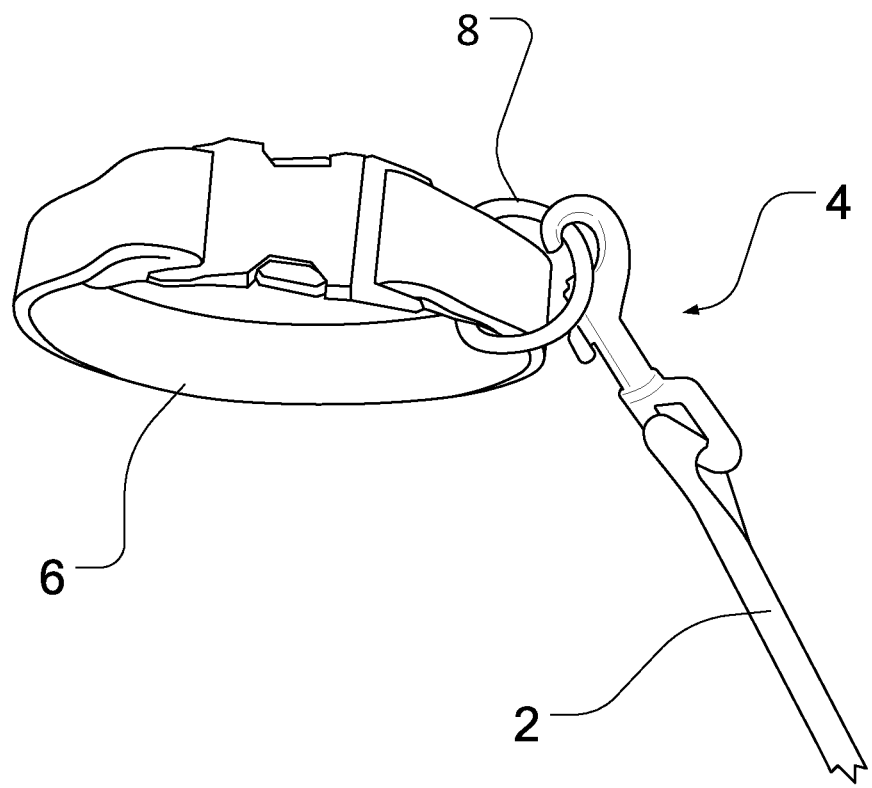
FIG. 1a to 1c are perspective and enlarged view of prior art devices.
Figure 1B:
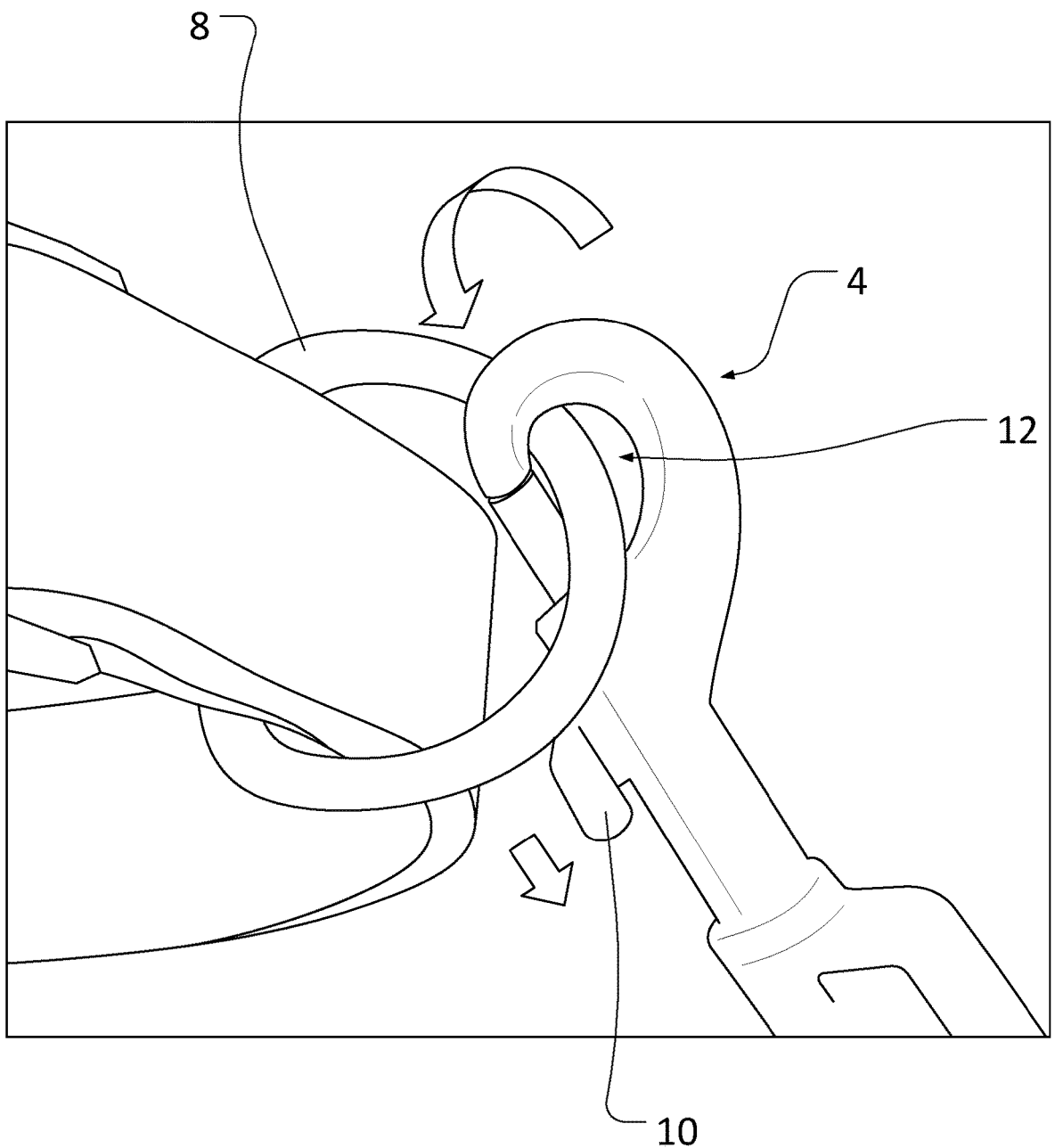
Figure 1C:
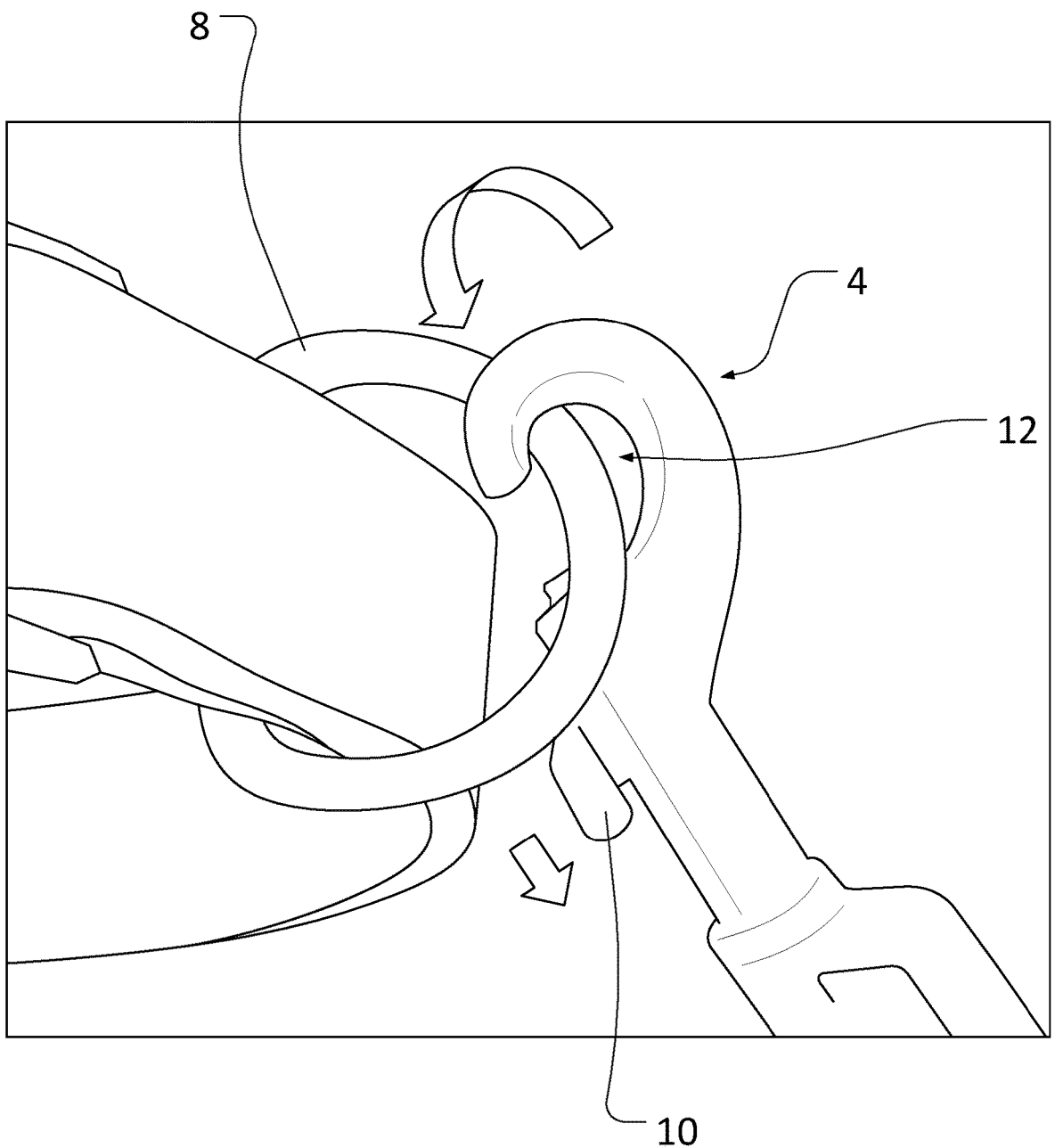
Figure 2:
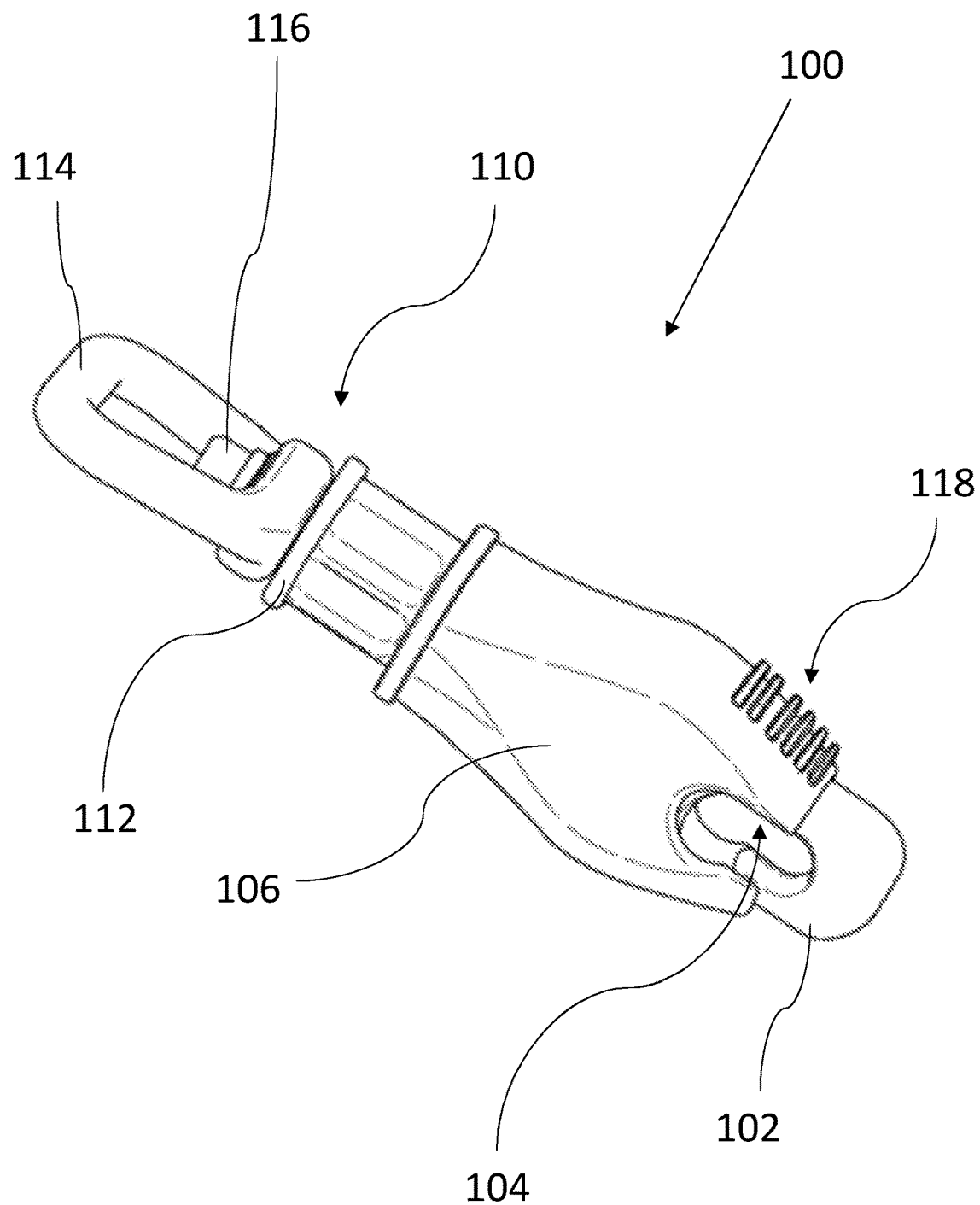
FIG. 2 is a perspective view of the releasable coupling device according to the present disclosure.

FIG. 2 illustrates the main components of the releasable coupling device 100 according to the present disclosure.

The releasable coupling device 100 comprises a body 102. The body 102 comprises an aperture 104. The releasable coupling device 100 further comprises a sleeve 106 positioned around, and slidable relative to, at least a portion of the body 102.

The body 102 and the sleeve 106 may be made from conventional materials, including metals such as brass and stainless steel, and/or plastics materials, for example nylon, and/or a composite material. The body 102 and the sleeve 106 do not need to be made of the same material, for example the body 102 may be of a metal material and the sleeve 106 may be of a plastics or composite material. The body 102 and/or the sleeve 106 may optionally be made from a composite material. Suitable materials and their benefits will be known to the skilled person.

Figure 3:
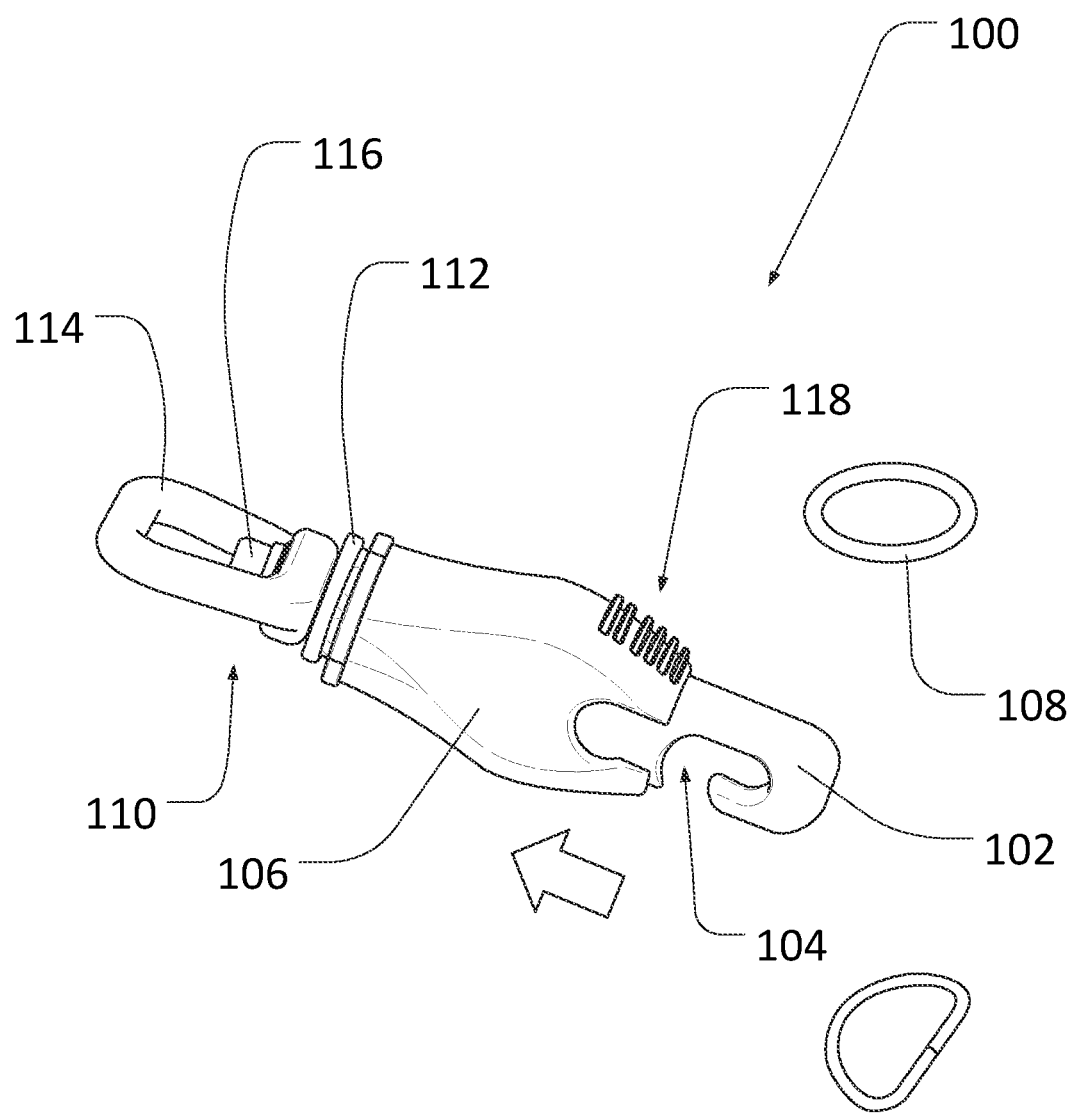
FIG. 3 is a perspective view of the releasable coupling device in an open position.

The sleeve 106 is slidable between an open position and a closed position, as illustrated by the arrow in FIG. 3. The sleeve 106 is slidable along a principal axis of the body 102 to selectively unocclude and occlude the aperture 104.

The releasable coupling device 100 defines a track configured to guide or constrain movement of an attachment 108 receivable within the aperture 104 along a predefined or present or predetermined movement path.

The track may be defined the body. Alternatively, the track may be defined by the sleeve. Alternatively, the track may be defined by the body and the sleeve.

Figure 17:
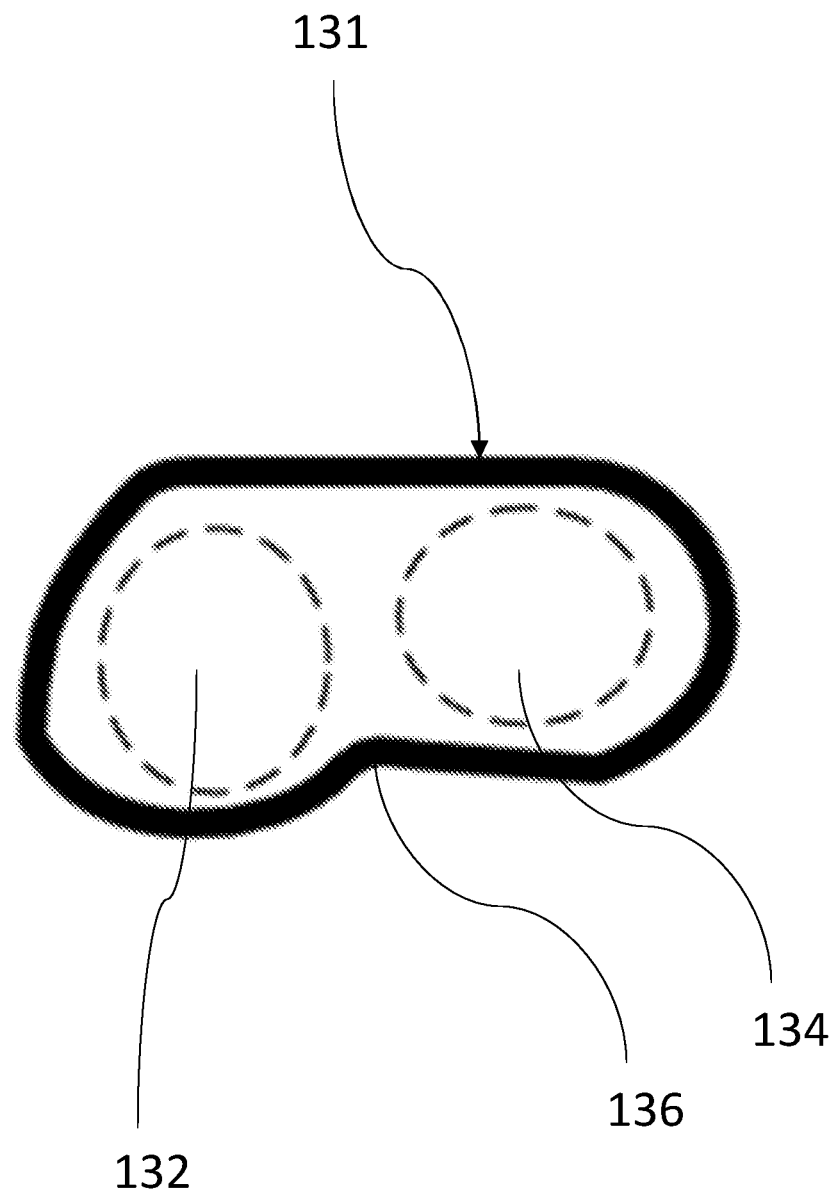
FIG. 17 is a schematic view of the track of FIG. 4 shown in isolation.

In the example embodiment of FIGS. 2 to 15, the track is defined at least partially by the body and at least partially by the sleeve. In the closed position, the body and the sleeve co-operate to define the track. The track is the boundary or space defined between the body and the sleeve in which an attachment may be received. The track serves to guide or constrain or influence movement of an attachment received with the aperture. In other words, the track is the perimeter of an area or space in which an attachment received within the aperture is able to move. FIG. 17 shows an example shape of an example track that is defined by the shape and/or geometry of the body and the sleeve of the example of FIGS. 2 to 15.

In some embodiments, the shape and/or geometry of the track may generally conform to the shape and/or geometry of the aperture. In other embodiments, the shape and/or geometry of the track may be different to the shape and/or geometry of the aperture.

The track creates a path or movement path for an attachment received within the aperture. The movement path is a path or channel or guide or slot etc. along, around, through or in which, an attachment may move or be moved or be guided when an attachment is positioned in the aperture and moveable along, around, through, in, or on, the track.

In the open position at least a portion of the aperture 104 is at least partially unoccluded, preferably entirely unoccluded, so as to permit coupling of the device 100 to an attachment 108 receivable within the aperture 104, as illustrated in FIG. 3. In the open position there is a clear opening or mouth or channel or slot or entry point or gate or gateway forming part of, or in communication with, the aperture 104 through which an attachment 108 can pass so as to be received within the aperture 104.

In the closed position, as illustrated in FIG. 2, an opening in/into/of, or leading to, the aperture 104 is at least partially occluded, preferably entirely occluded, so as to close the aperture 104—i.e., resist decoupling of the of the device 100 by removal of an attachment 108 from the aperture 104.

As seen in FIG. 3, a distal end of the body 102 is shaped as a hook and/or defines a hook portion permitting engagement of the coupling device 100 with an attachment 108.

Figure 4:
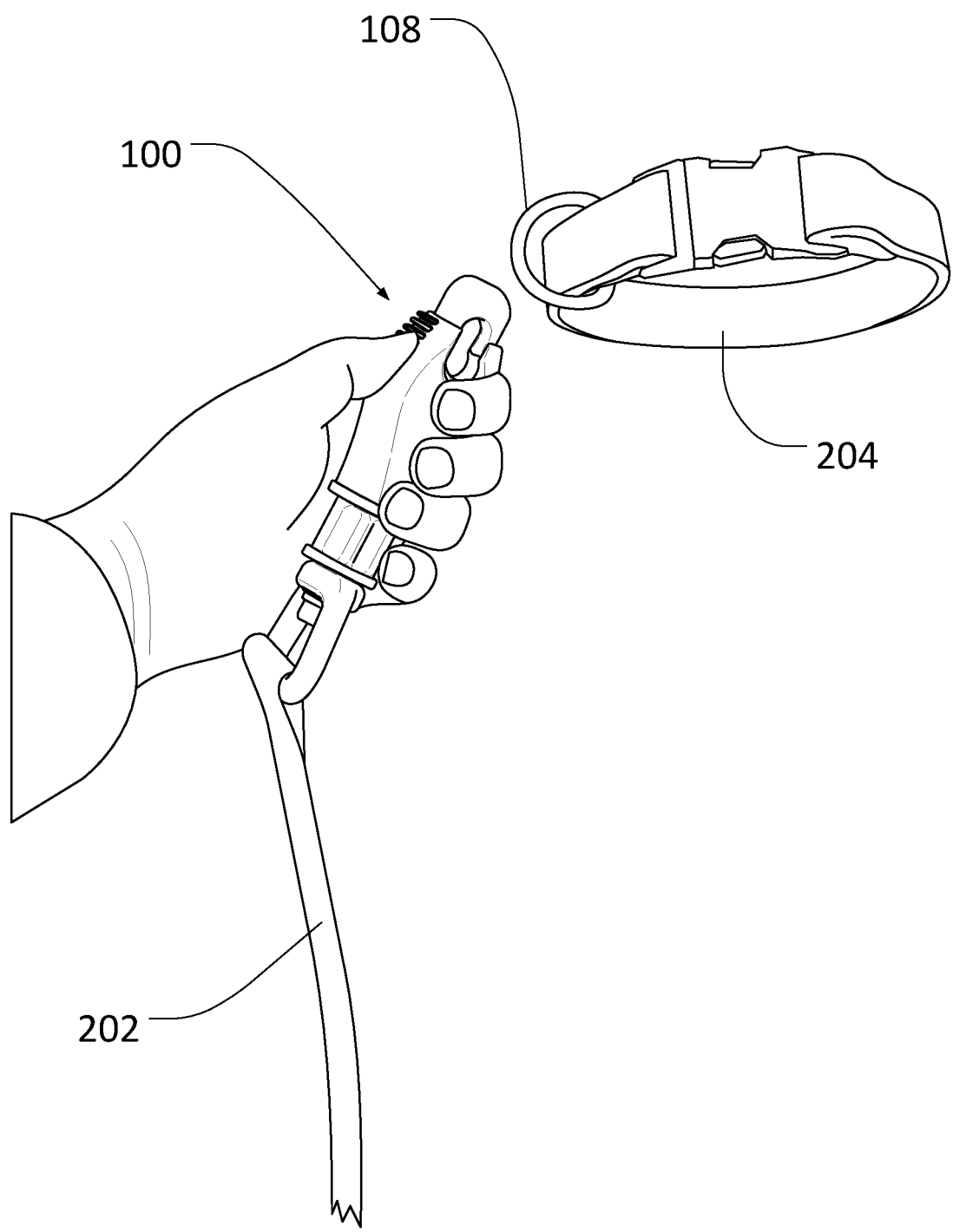
FIG. 4 is a releasable coupling device for use with a leash for guiding an animal.

FIG. 4 illustrates a releasable coupling device 100 according to the present disclosure that is suitable for use with a lead or leash 202 for leasing or guiding or controlling an animal. In particular, FIG. 4 demonstrates the user connecting the releasable coupling device 100 to an attachment 108 on part of a collar/halter/headcollar/harness 204. An attachment shown in FIG. 4 is a circular ring 108. It will be appreciated that an attachment 108 may also be a D-ring, triangular ring, oval ring etc. In other applications, the releasable coupling device 100 may also be connected to other suitable attachments, such as a belt loop, rucksack loop, mountaineering ring, carabiner, sailing rigging, airplane tie down, spearfishing bag, fence post, or other such attachment(s) known by the person skilled in the art.

As seen in FIGS. 2 and 3, the releasable coupling device 100 according to this example embodiment comprises a swivel system 110. The swivel system 100 comprises a swivel axle 112, a swivel-eye or ring 114 and a circlip retaining ring 116. The swivel axle 112 extends through the swivel-eye or ring 114 such that the swivel-eye or ring 114 can rotate around it. This ensures that the leash or other connected object does not become twisted, tangled or deformed.

The circlip retaining ring 116, may be snapped onto an axle 112 at a proximal end of the body, and is the cap or rear hub of the swivel system 110 that holds and retains the swivel ring 114 on the swivel axle 112. Use of the circlip retaining ring 116 increases the elongation strength of the device 100 by distributing tension loads over a larger surface area and/or over multiple surfaces.

The swivel system 110 is attached to the end of the body 102 but, in some example embodiments, the swivel axle 110 may be integral with the body 102. The swivel system 110 can be of various shapes including circular, oval, square, rectangular, trapezium etc. Such objects to which the swivel system 110 may be connected to may include but are not limited to, leashes, chains, riggings, ropes, lanyards or other objects that are known by the skilled person.

Figure 5:
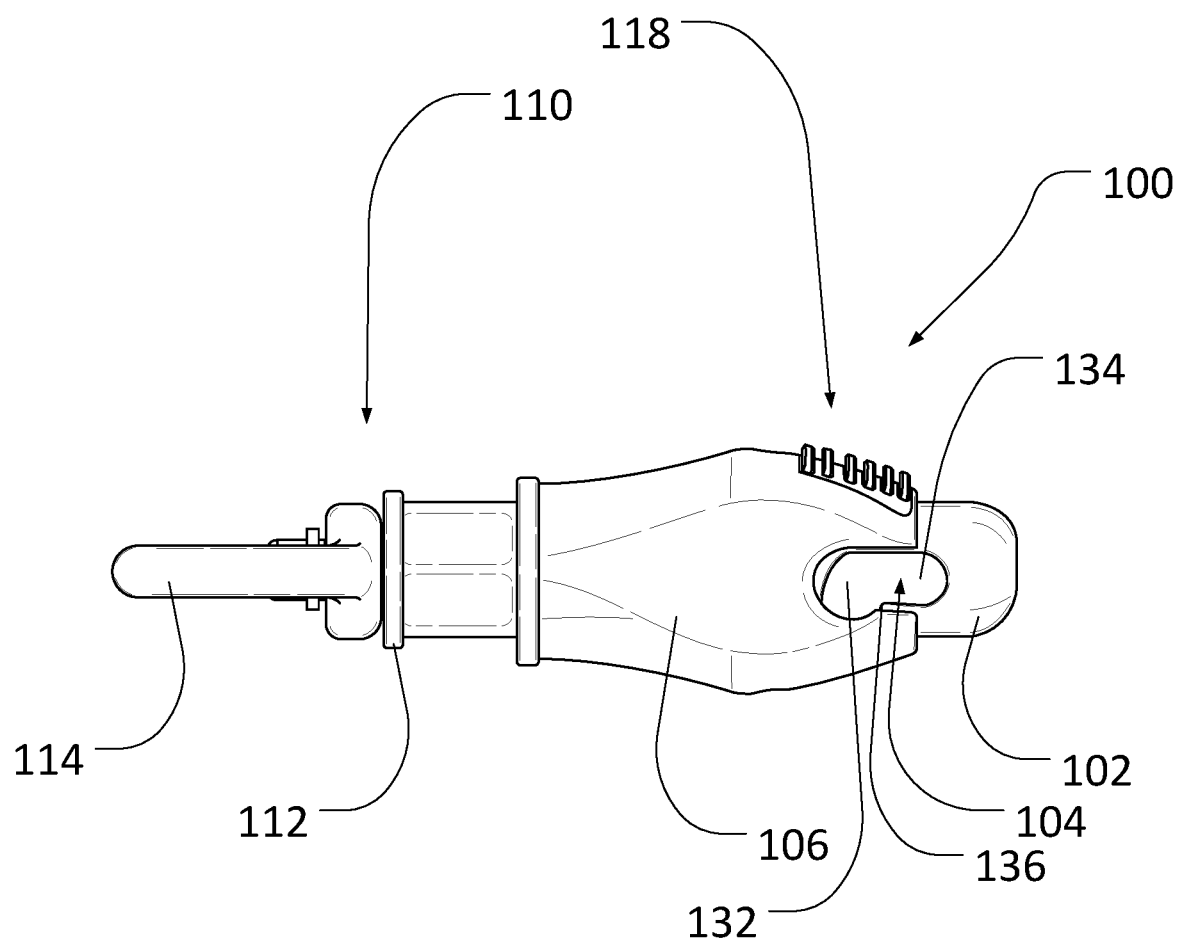
FIG. 5 is a side view of the releasable coupling device according to the present disclosure.

FIG. 5 illustrates a side view of the releasable coupling device 100. In this example embodiment, the body 102 and sleeve 106 are shown to have a generally tear-drop shape. This tear-drop shape, with its added material, provides additional structural reinforcement to the body 102 and helps to prevent the hook bending motion described below. However, as understood by the skilled person other suitable shapes are envisaged, including generally circular, generally oval, generally square, generally rectangular, generally trapezium etc.

An external surface of the sleeve 106 according to the example embodiment comprises a gripped or knurled portion 118. The gripped portion 118 is configured to assist a user when holding the sleeve 106 and sliding the sleeve 106 from an open position to a closed position.

Further, a first or distal end of the sleeve 106, proximate a first end of the body 102, comprises recessed or relieved or cutaway or concave side portions. As shown in FIGS. 2 to 5, said recessed or cutaway side portion are substantially continuously curved and are shaped so as to substantially corresponded with and define at least a portion of a shape of the track. It will be appreciated that the recessed or cutaway or concave side portions enable an attachment received within the aperture 104 to be at least partially received within, or encapsulated by a distal end of the slide.

Figure 6:
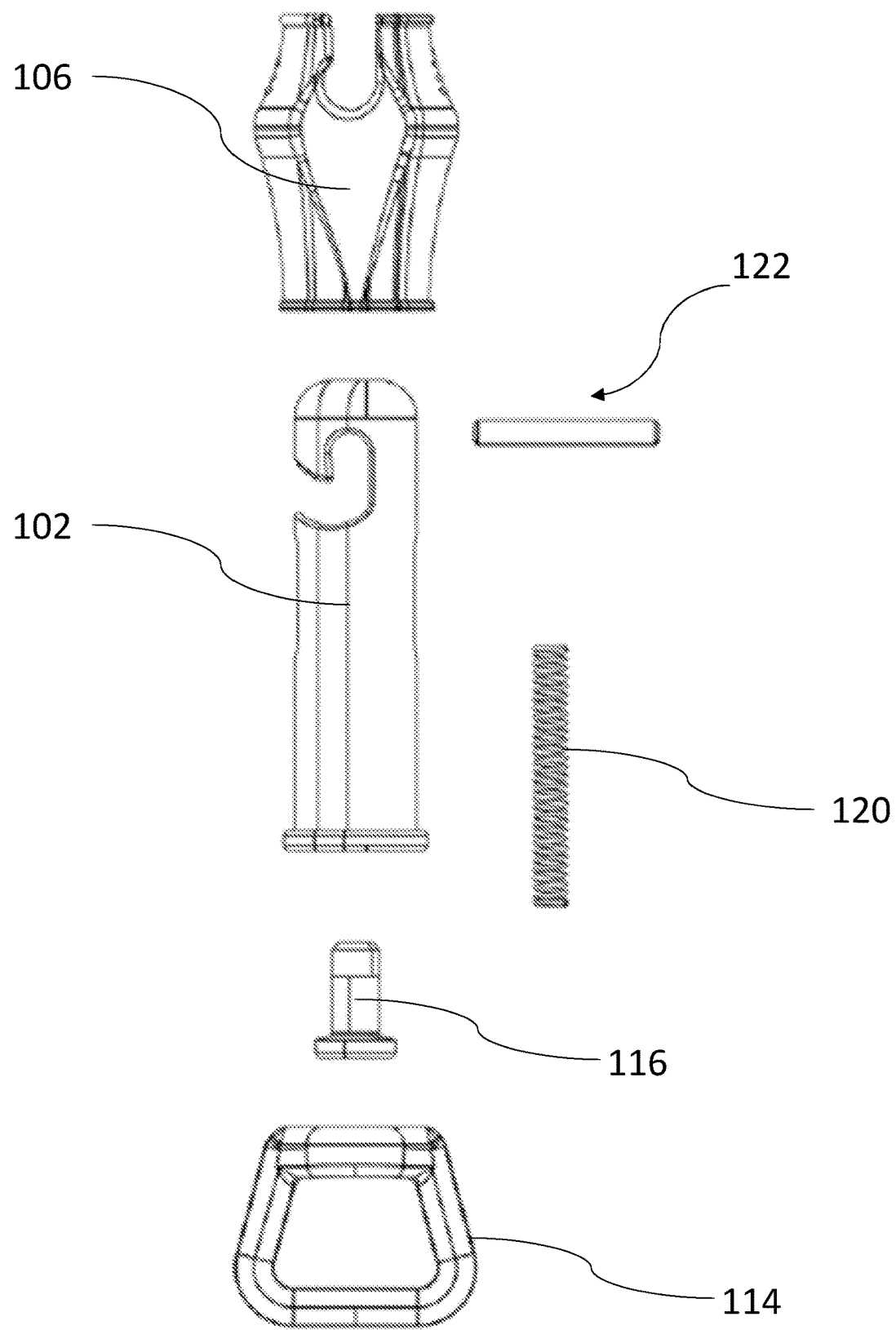
FIGS. 6 and 7 are exploded views of the releasable coupling device.
Figure 7:
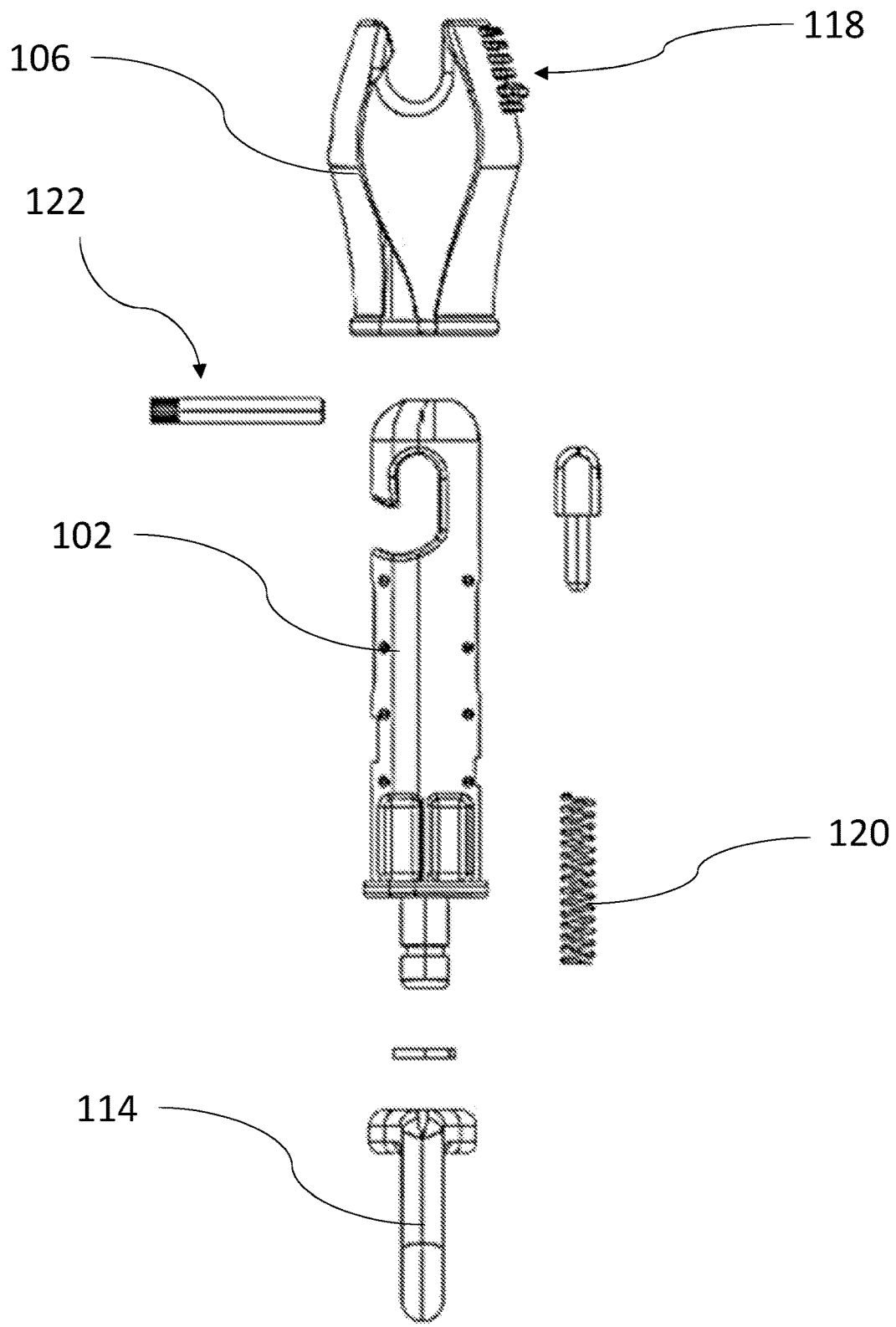

FIGS. 6 and 7 show exploded views of the parts of a releasable coupling device according to the present disclosure discussed above. In particular, FIGS. 6 and 7 illustrate, a sleeve 106, a body 102, a resiliently deformable member 120, a locking mechanism 122 and a swivel system 110.

Figure 8:
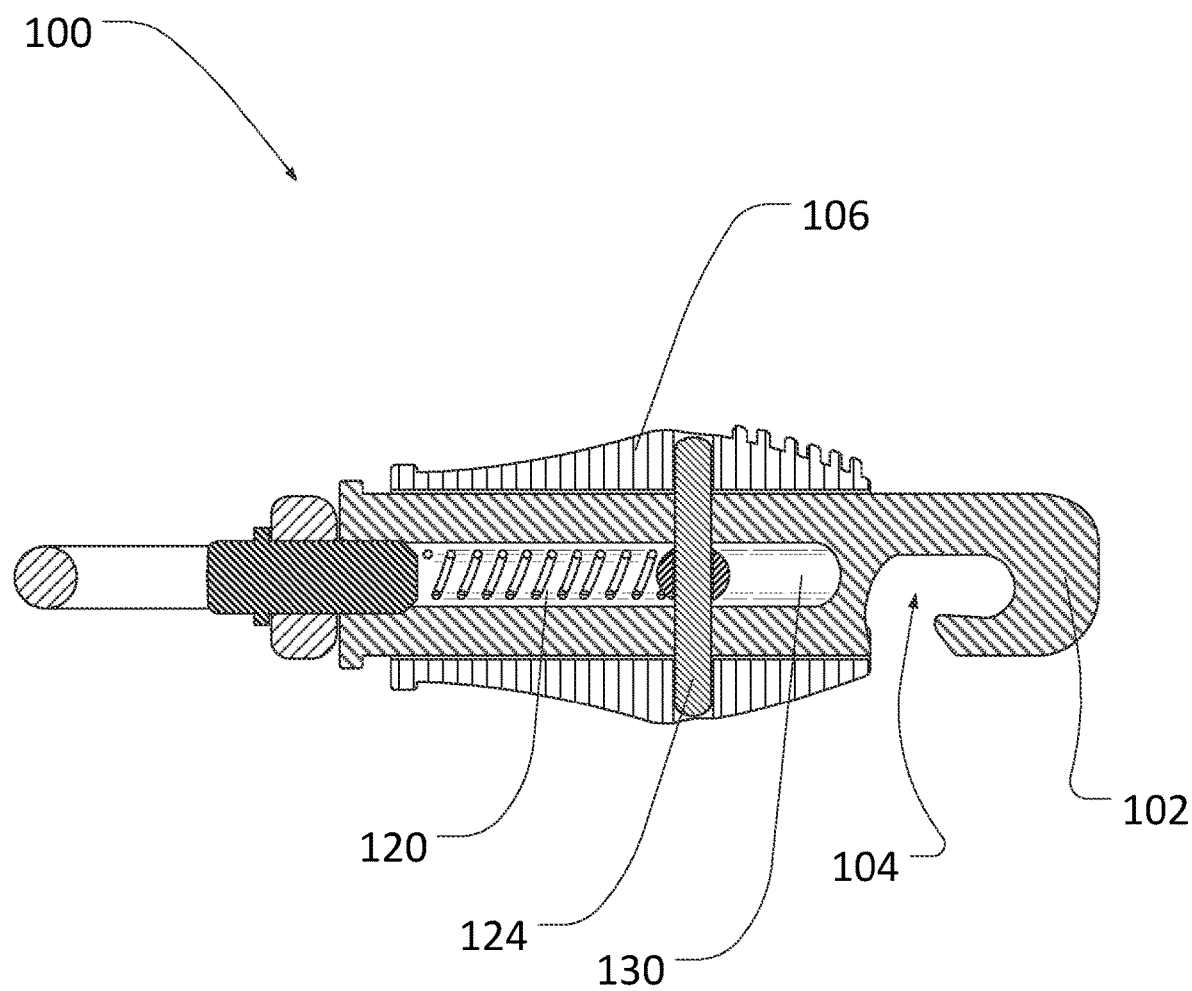
FIG. 8 is a side cross-section view of the releasable coupling device of FIG. 1.

As shown in FIG. 8, the body 102 of the releasable coupling device 100 comprises a coiled spring 120. The coiled spring 120 is configured to urge the sleeve 106 into the closed position. The coiled spring 120 is located within a closed end channel 130 in the body 102. The closed end channel 130 is preferably substantially cylindrical. Although the resiliently deformable member of the example disclosure is a coiled spring 120, other resiliently deformable members will be appreciated by the skilled person. For example, the resiliently deformable member may also be a plunger.

In the example embodiment of FIG. 8, the coiled spring 120 pushes against a spring stop 124. The spring stop 124 is a separate pin or other member that is coupled or attached to at least one end to the sleeve 106. The spring stop 124 may be coupled to the sleeve 106 by various known methods and can be located in various positions. In this example embodiment the spring stop 124 is made of a metallic material, however, other suitable materials will be appreciated by the skilled person.

Figure 10:
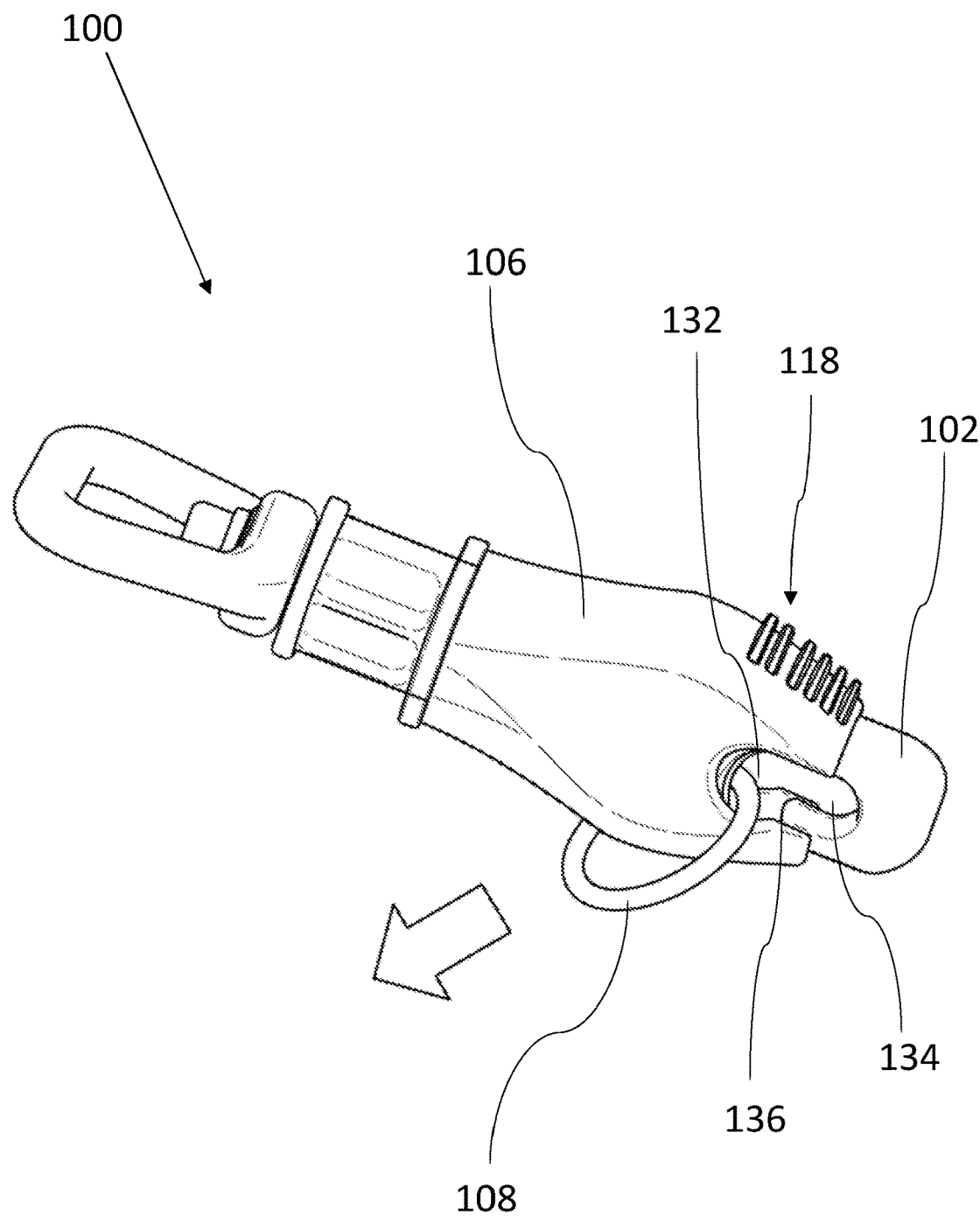
FIG. 10 is a perspective view of the releasable coupling device with an attachment in a first region.
Figure 11:
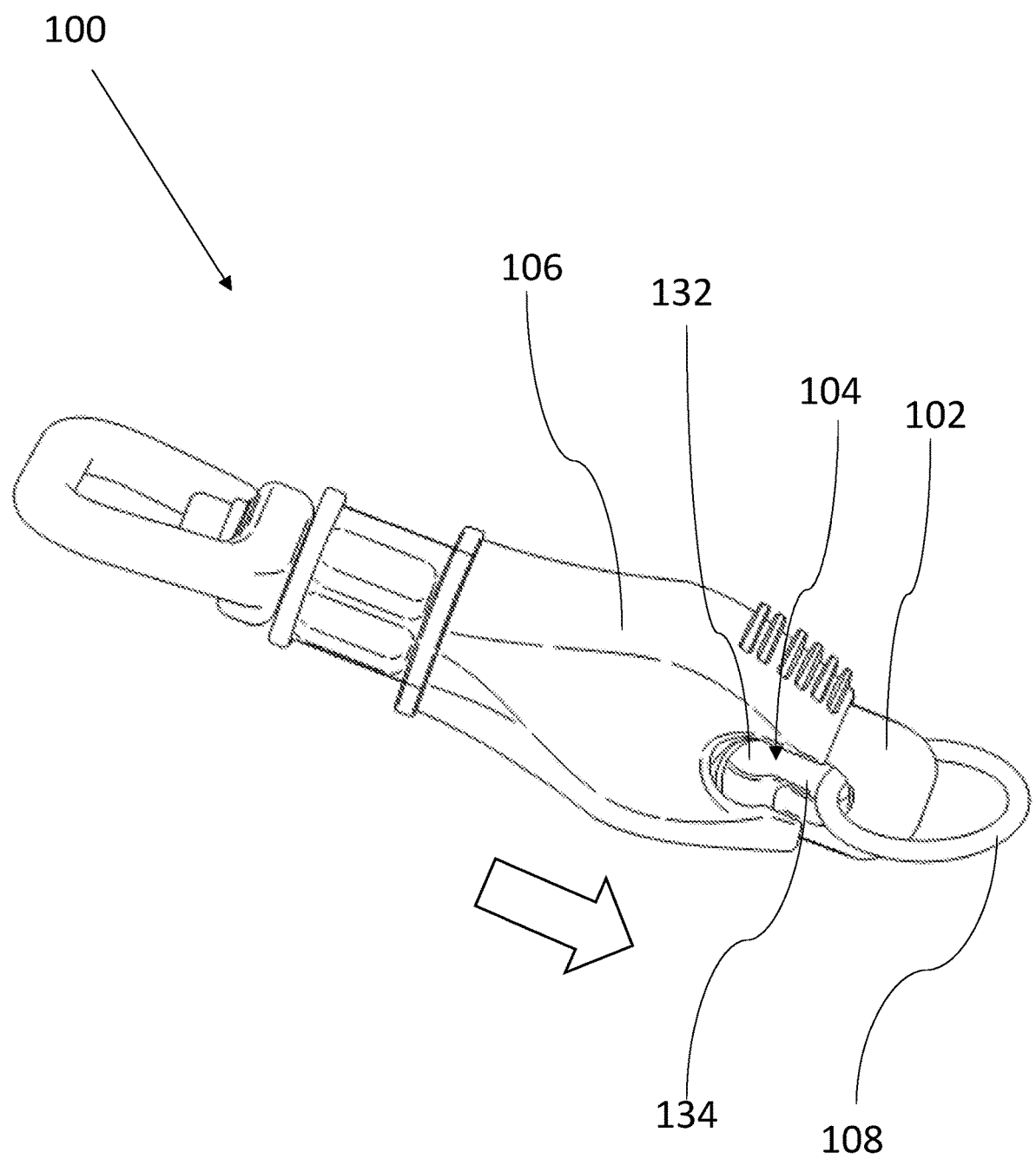
FIG. 11 is a perspective view of the releasable coupling device with an attachment in a second region.

The releasable coupling device 100 is retracted to an open position by the user applying a force opposite to the sleeve that is greater than the force of the resiliently deformable member i.e., the coiled spring 120 in the example disclosure of FIG. 8. The force applied to the sleeve 106 is translated to the coiled spring 120 via the spring stop 124. The user may then manipulate the device 100 and an attachment 108 until an attachment 108 is located within the aperture 104. At this point the sleeve 106 may be released. Upon release, the spring 120 causes the sleeve 106 to snap back into the closed position and retain an attachment 108 within the aperture 104 of the device 100 as shown in FIGS. 10 and 11.

Figure 9:
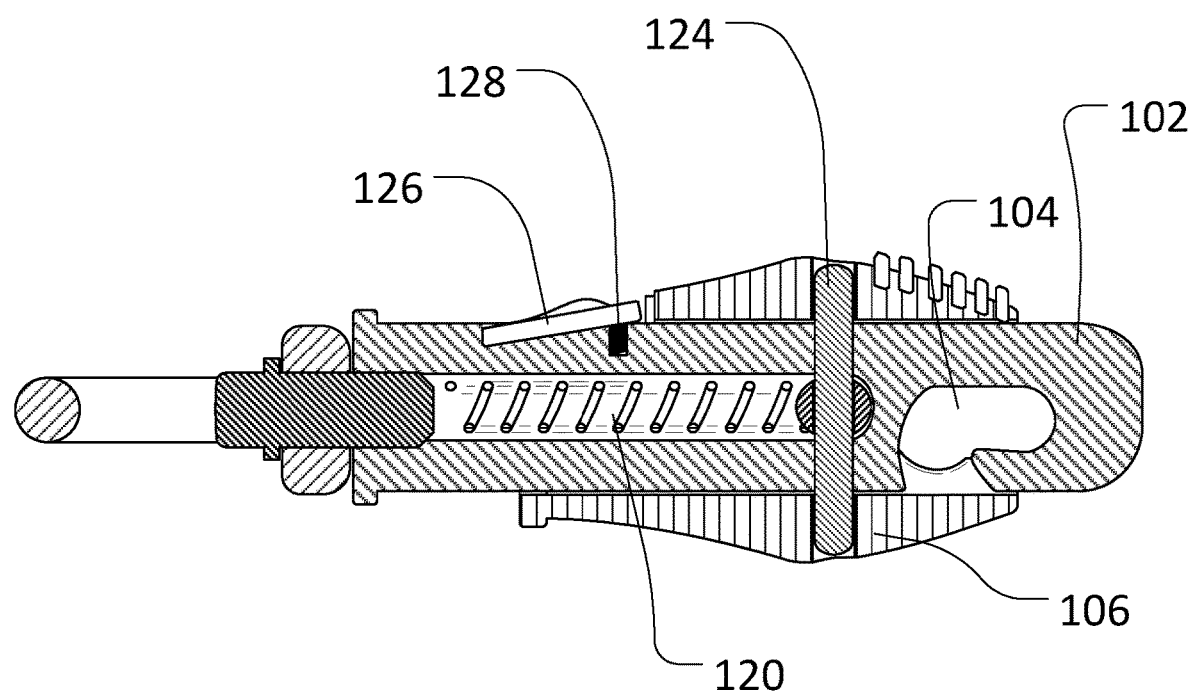
FIG. 9 is a side cross-section view of the releasable coupling device comprising a locking system.

As mentioned previously, the sleeve 106 is held in place by the force of the coiled spring 120 or other resiliently deformable member. In some example embodiments, the force of the spring 120 may be supplemented with a latch or locking system 122. FIG. 9 illustrates a cross-section view of a releasable coupling device 100 further comprising a locking system 122. The locking system 122 of FIG. 9 includes a lock actuator 126 and an additional spring 128. The additional spring 128 biases the lock actuator 126 into a position abutting a surface of the sleeve 106 such that the sleeve 106 cannot move laterally unless the actuator 126 is depressed (through application of force sufficient to overcome the biasing force of the spring) to release the sleeve 106, thereby allowing it to be moved laterally along the body. In various other example embodiments of such a releasable coupling device 100, the lock system 122 may utilise a detent device, a ball detent, or locking button located within the retaining sleeve 106.

The sleeve 106 is positioned around a portion of the body 102 and provides structural reinforcement to the body. The sleeve 106 opposes or restricts bending motion of the body 102 when linear force or tensile force is applied to the body 102. This in turn mitigates the stress on the hook portion of the body 102 in particular and increases the lifetime of the device.

When the sleeve 106 is in the closed position, as shown in FIG. 5 for example, the releasable coupling device 100 defines a track 131 (FIG. 17) configured to guide an attachment 108 receivable within the aperture 104 along a predetermined movement path. The track is defined by at least partially by the hook end of the body and at least partially by the sleeve.

The presence of a track is one reason why the device 100 is differentiated from the prior art devices. In the prior art devices, an attachment received within the aperture is free to move or sit or locate itself anywhere within the envelope or perimeter of the aperture. Movement of an attachment is not influenced or restricted or guided. There is no predefined or predetermined path of movement. In the present device, the track serves to influence or restrict or guide movement of an attachment 108 receivable within the aperture 104. An attachment 108 is moveable within the aperture 104 in a predefined or predetermined or confined way. This is because the track defines a movement path for an attachment 108 receivable within the aperture 104. As such, an attachment 108 cannot move in an undefined or unrestricted or non-desired manner. Instead, an attachment 108 is moveable within clear constraints so that is moveable in a predictable or defined or predefined or predetermined way.

As illustrated and with reference to FIG. 17 in particular, the track 131 is non-linear. In other words, the track is not a straight path or a straight route for an attachment 108 to take. The track comprises and/or defines a first region 132 and a second region 134. The track is configured to guide an attachment 108 receivable within the aperture 104 between the first region 132 and the second region 134. Therefore, the track between the first region 132 and the second region 134 is non-linear.

The first region 132 is defined by the body 102 and the sleeve 106 in the closed position. The second region 134 is defined by the body 102 and in particular the hook portion of the body 102. Both the first region 132 and the second region 134 are, at least partially, substantially continuously curved.

A step or protrusion 136 is defined between the first region 132 and the second region 134 of the track. This protrusion 136 which may be a distinctly protruding or convex surface structure (which may even have a distinct vertex or turning point or point of inflection where linear or curvilinear surfaces come together) clearly distinguishes the first region 132 and the second region 134 from one another and provides a partial obstacle or break in the path if an attachment 108 moving between the first 132 and second region 134. As such, an attachment 108 will not tend to adopt or sit at a position at or proximate the step or protrusion 136. Instead, it will tend towards or be encouraged to adopt a different, defined position, such as the first region 132 or the second region 134.

Therefore, as shown in FIG. 10 when an attachment 108 is in the first region 132 of the track it has a tendency to remain in the first region 132 until a force is applied with a vertical component (when in the orientation of FIG. 17) sufficient to force an attachment 108 over the step or protrusion 136. This is significant because when a pull force is applied to an attachment 108, the lateral component of the force (toward the swivel end of the device) is resisted by the body 102, while the downward component of the force is resisted by the sleeve 106. Due to the combination of complex curves of the first region 132, the sleeve 106 remains in the closed position regardless of the motion of an attachment 108, in particular, regardless of any twisting motion. Further, due to the configuration of the first region 132, the twisting motion of an attachment 108 and/or device 100 may in fact further self-lock the sleeve 106 in the closed position.

With reference to FIG. 10, it will also be appreciated that if a force is applied in the direction shown, the fact that the track is formed at least partially by the body, in the illustrated example, by a proximal surface of a hook end of the body, this will serve to oppose unlocking movement of the sleeve and oppose accidental unlocking of the device.

As shown in FIG. 11, the distal end of the aperture and/or the track protrudes beyond a distal end of the sleeve 106 when the sleeve 106 is in the closed position. Specifically, a distal end of the second region 134 of the track substantially protrudes beyond a distal end of the sleeve 106 when the sleeve 106 is in the closed position. Therefore, when an attachment 108 is in the second region 134, as shown in FIG. 11, an attachment 108 applies little to no lateral force on the sleeve 106, and thus cannot accidentally force the sleeve 106 to move towards the open position. Due to the combination of complex curves of the second region 134, the sleeve 106 remains self-locked in a closed position when an attachment 108 is in the second region 134 as shown in FIG. 11 regardless of the various twisting motions of the device 100 and attachment 108.

The presence of attachment 108 when located in the second region 134 of the track, where in combination with attachment 108 and the geometry of the aperture, creates a self-locking position for the sleeve 106, automatically created by the geometry of the body and/or the sleeve and/or the aperture and/or the track and/or an attachment 108, which is another reason why the device 100 is differentiated from the prior art devices. This arrangement could be thought of as being somewhat similar to a Chinese ring puzzle, where the puzzle may only be solved by the correct orientation of one of two or more, or multiple, parts or components.

It will be appreciated that when a force is applied in the direction shown in FIG. 11, an attachment is supported or restricted by the distal end of the body and the device is maintained in the locked configuration.

FIGS. 12 to 15 further illustrate the twisting motions between the releasable coupling device 100 and a ring or other object and how the self-locking and/or auto-locking geometry of the first 132 and second region 134 formed by the sleeve 106 and body 102 serves to oppose or restrict movement of the sleeve 106 so as to prevent accidental opening of the device 100 or accidental release of an attachment 108 from the aperture. In this regard, FIGS. 12 to 15 are an orthogonal view, a front view, and a pair of top views, respectively, of the releasable coupling device 100 of FIG. 2, shown against X-, Y-, and Z-axes.

Figure 12:
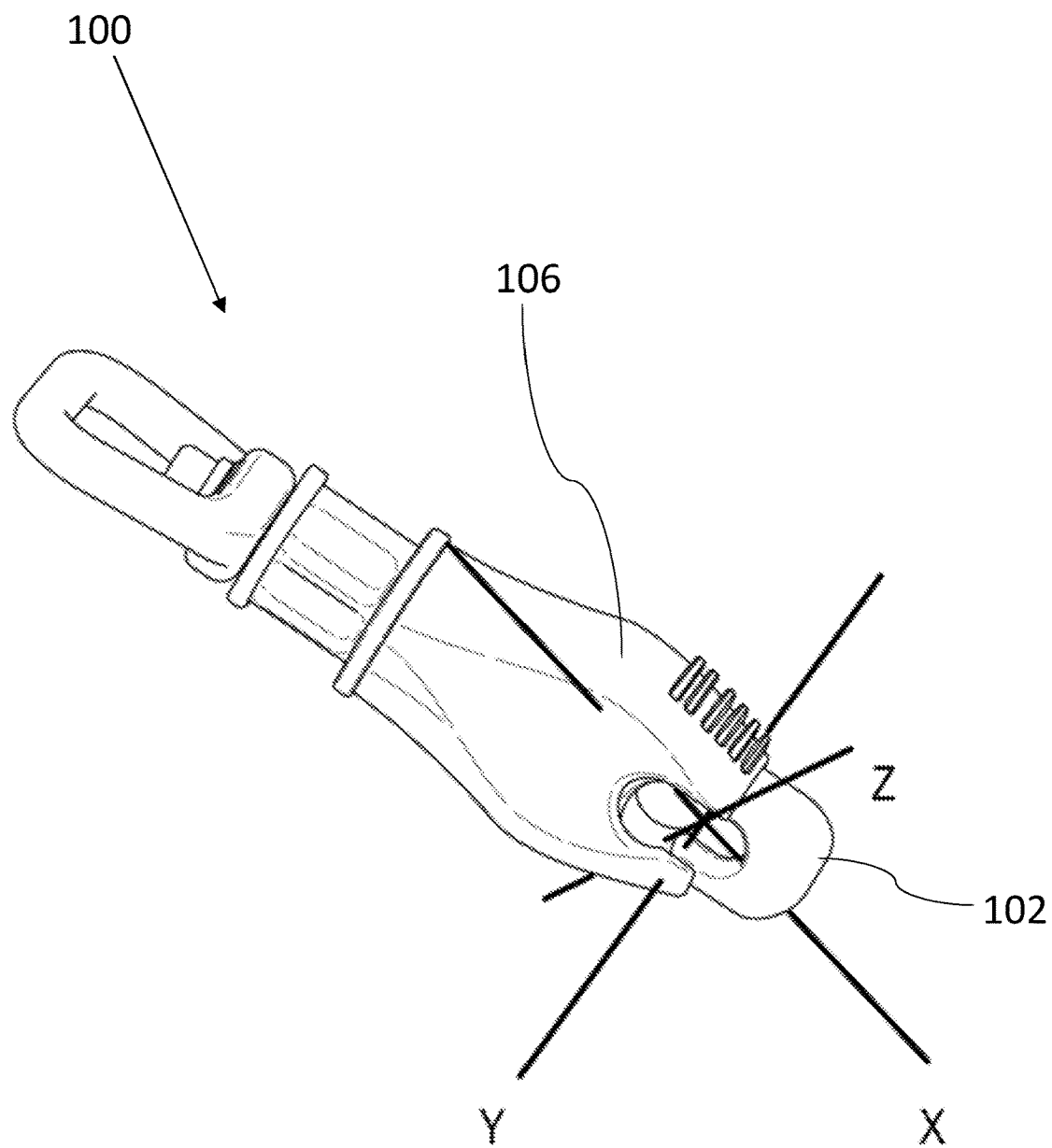
FIGS. 12 to 15 illustrate the X, Y and Z axis twisting motions of the releasable coupling device.
Figure 13:
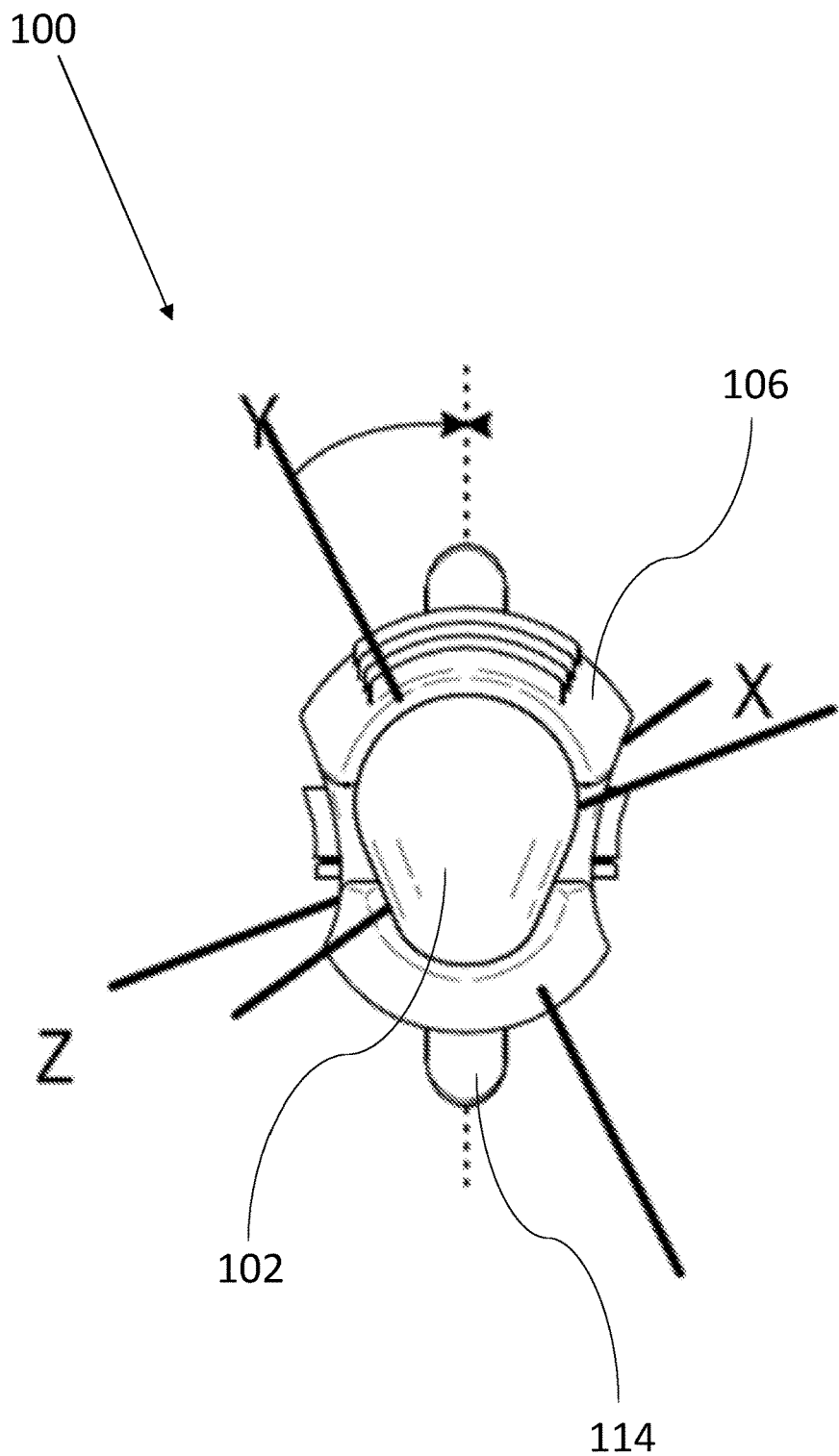
Figure 14:
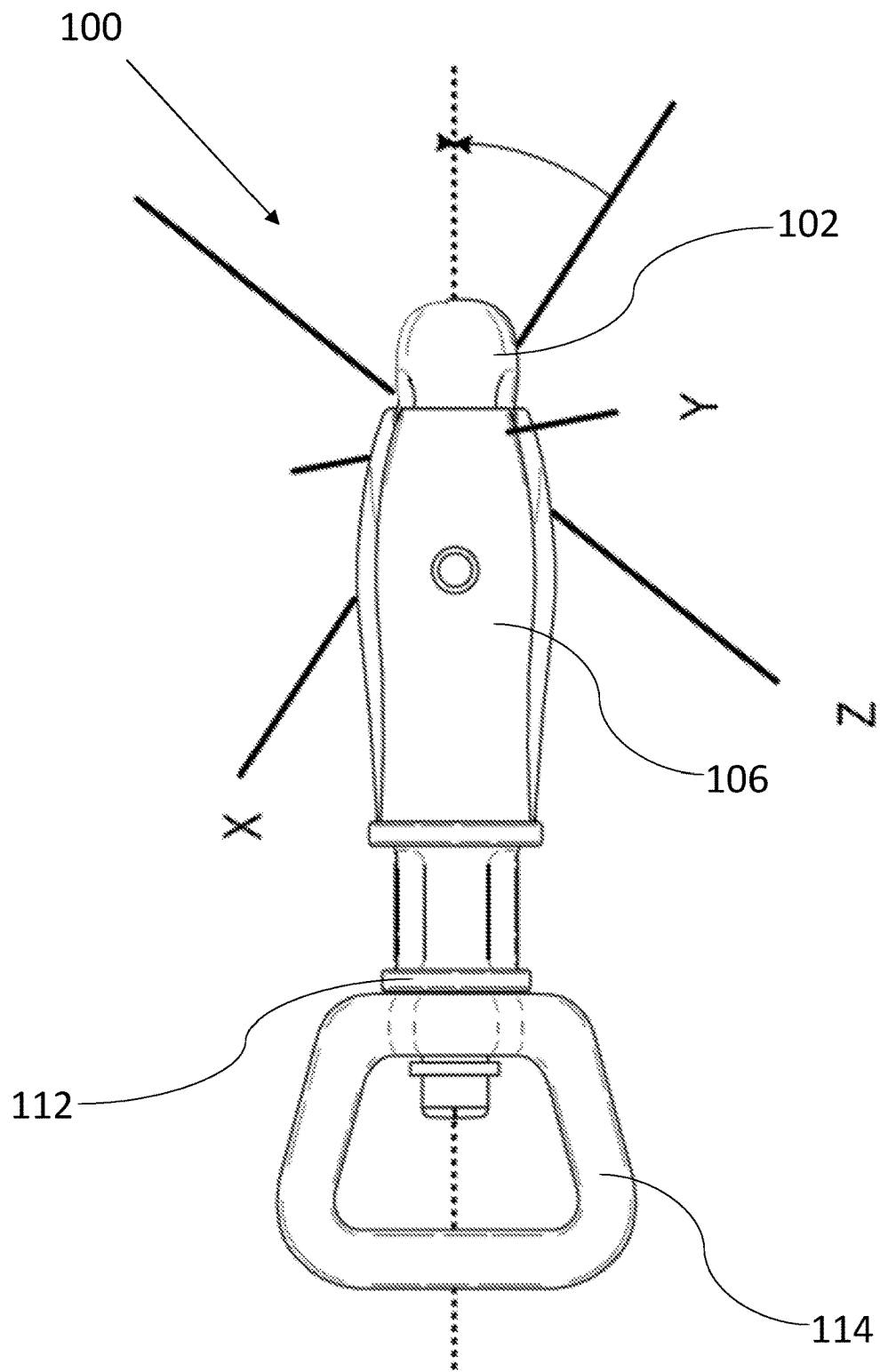
Figure 15:
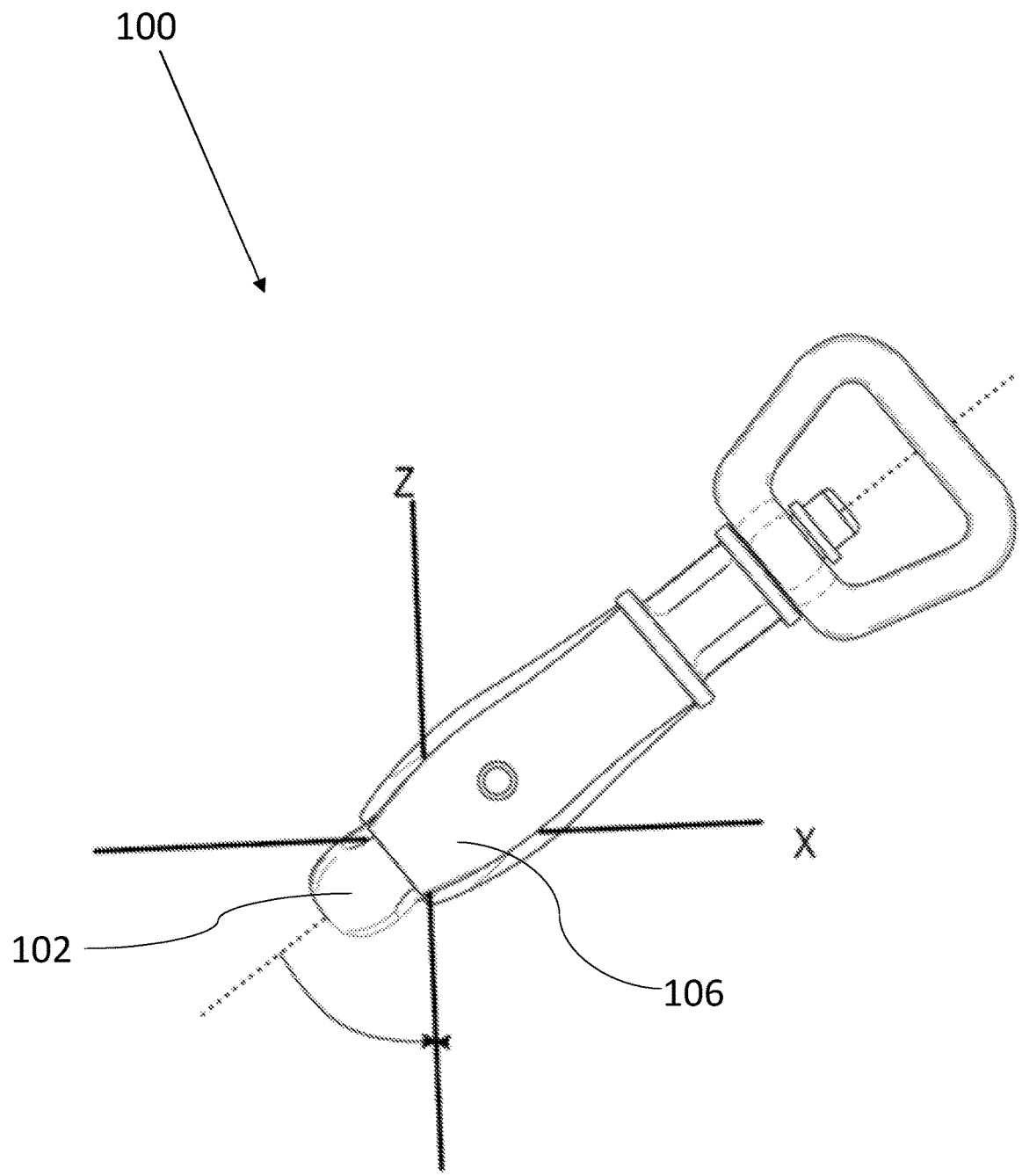

As represented thereby, a ring or other attachment 108 would be restricted in movement in the X, Y and Z directions by surfaces of the sleeve 106 and body 102, and particularly by primary contact surfaces on the sleeve 106 and body 102, respectively, as shown in FIG. 12. FIG. 13 illustrates how a ring or other object 108 would be restricted in the vertical axis in the Y direction by vertical angle. FIG. 14 illustrates how a ring or other object 108 would be restricted by the horizontal axis in the X direction by vertical angle. FIG. 15 illustrates how a ring or other object 108 would be restricted by the horizontal axis in the Z direction by vertical angle.

FIGS. 12 to 15 show the X, Y and Z axis twisting motions of the releasable coupling device 100 and how an attachment 108 is then lodged into the first 132 and/or second region 134, thus auto-locking the device 100 in the closed position and restricting the movement of an attachment 108 within the track to prevent accidental opening.

The particular shape of the track, the first region 132, the second region 134 and the step/protrusion 136 mean that when an attachment 108 is retained or located within the aperture, an attachment 108 tends to remain in a particular one of the first region 132 or the second region 134 upon travelling along the track.

Further, the particular shape of the track, the first region 132, the second region 134 and the step/protrusion 136 mean that when an attachment 108 is rotated, twisted or moved in a particular manner such an attachment 108 is no longer parallel to the longitudinal axis, an attachment 108 is constrained by the sleeve 106 and the body 102 in at least one of the X, Y, Z directions discussed above. This means that an attachment 108 cannot or at least is partially prevented from moving within the aperture to cause accidently opening of the device 100.

Further still, the particular shape of the track, the first region 132, the second region 134 and the step/protrusion 136 mean that when an attachment 108 is rotated, twisted or twisted or moved in a particular manner within the track (particularly the first region 132) such an attachment 108 is no longer parallel to the longitudinal axis of the body 102 an attachment 108 itself can self-lock the sleeve 106 in the closed position.

FIG. 13 provides a view of a distal end of the device 100. The front uppermost corners of the lower jaw of the recess in the sleeve 106 may be provided with a relief, or ramp, or incline, or angle or chamfer as shown. This may comprise an angle of between about 30 and about 60 degrees, preferably between about 35 and about 55 degrees, preferably between about 40 and about 50 degrees, preferably about 45 degrees. This may be particularly advantageous for devices that will or may be used to couple to a D-ring such as may be used on an animal collar, halter, headcollar or harness to restrain, control, guide an animal, for example a pet. This relief, or ramp, or incline, or angle or chamfer may mean that the auto-locking or self-locking nature of the device 100 is facilitated when an attachment of a certain shape, particularly a D-ring, is received within the aperture.

With reference to FIGS. 12 to 15, the auto-locking or self-locking nature of the device is apparent. When an attachment is in the first region of the track and a force is applied in one of a multitude of different directions, particular one having a twisting component, one side of at attachment will, by virtue of the core aspects of the shape and of the track already described, urge or force the sleeve into the closed position, thereby auto-locking or self-locking the device. An attachment may, for example, do one or a combination of the following to auto-lock or self-lock the device in the closed position:—

(i) bear against a portion of at least one cutaway portion or jaw of the slide—particularly the portion of the cutaway portion or jaw positioned proximate the opening that leads to the aperture—to urge or force the distal end of the sleeve into the closed position;

(ii) bear on one side of an attachment (e.g., a circular ring or D-ring) against a portion of the body defining part of the track and, on the other side of an attachment, bear against a portion of at least one cutaway portion or jaw of the slide—particularly the portion of the cutaway portion or jaw positioned proximate the opening that leads to the aperture—to urge or force the distal end of the sleeve into the closed position.

The geometry of any desired shape and configuration of the track, including the first region 132 and the second region 134, is definable by a set of composite Bézier curves and parametric equations. In this regard, FIG. 16 is a tabular illustration of the control points for the shape of an example track shape shown in FIG. 17. FIG. 17 clearly illustrates the separate first region 132 and second region 134 of the track.

FIG. 18 is a list of equations corresponding to those control points. The particular shape is physically defined by the inner surfaces of the body 102 (i.e., the contours of the aperture) and of the sleeve 106. In some cases, some but not all of those surfaces may be at least partially aligned with one another.

The shape of the track in the closed position which is specified and described by the control points and Bézier equations of FIGS. 16 and 18 can be proportionately enlarged or reduced in its size to render different sizes of the releasable coupling device 100. Differently-sized releasable coupling devices 100 could be used for different sized attachments 108 and to provide releasable coupling devices 100 with varied weight ratings, since the body 102 would be thicker or thinner. The control points and the Bézier equations can be proportionately altered depending on the desired size of the releasable coupling device 100.

It will be appreciated that the track may have an array of different shapes, as desired. It will also be appreciated that the geometry of any desired shape and configuration of the track, including the first region 132 and the second region 134, is definable by its own set of composite Bézier curves and parametric equations that will be unique and differ from those in FIG. 16.

Figure 19:
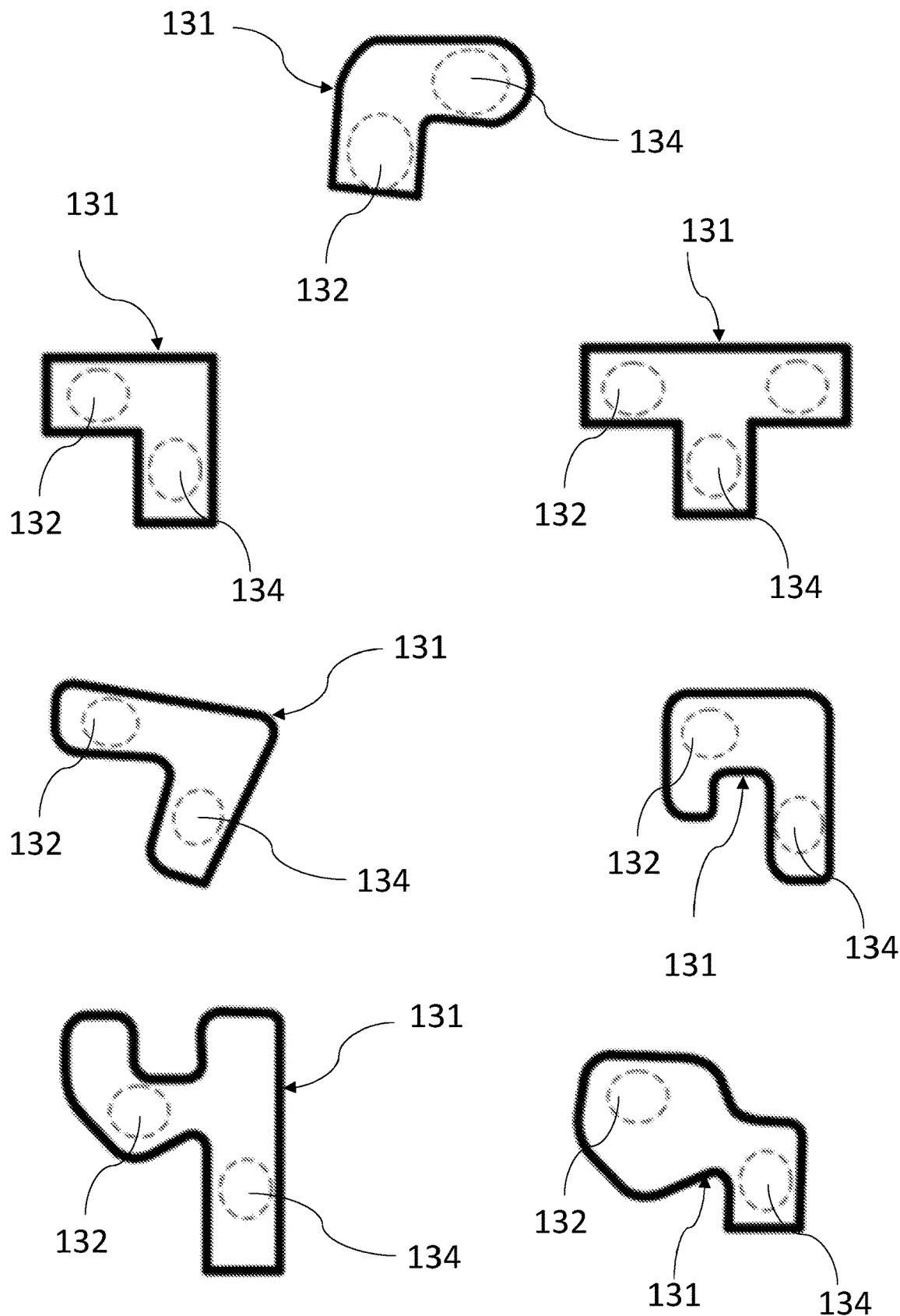
FIG. 19 is schematic views of alternatively-shaped track comprising a first region and a second region.

By way of example, a selection of other example alternative shapes of the track are shown in FIG. 19. FIG. 19 includes schematic views of alternatively-shaped first 132 and second regions 134 created by a combination of the body 102 and the sleeve 106. Such suitable alternative shapes may be generally "L"-shaped, generally "T"-shaped, have a generally curved shape, or the like. The alternative shapes highlighted by FIG. 19 all define a track between a first region 132 and a second region 134. In some cases, they have more than two regions or lobes for receiving an attachment, for example having first, second and third regions for receiving an attachment. Other track shapes having two or more regions or lobes for receiving an attachment are envisaged. It is not possible to depict all possible combinations.

Figure 20:
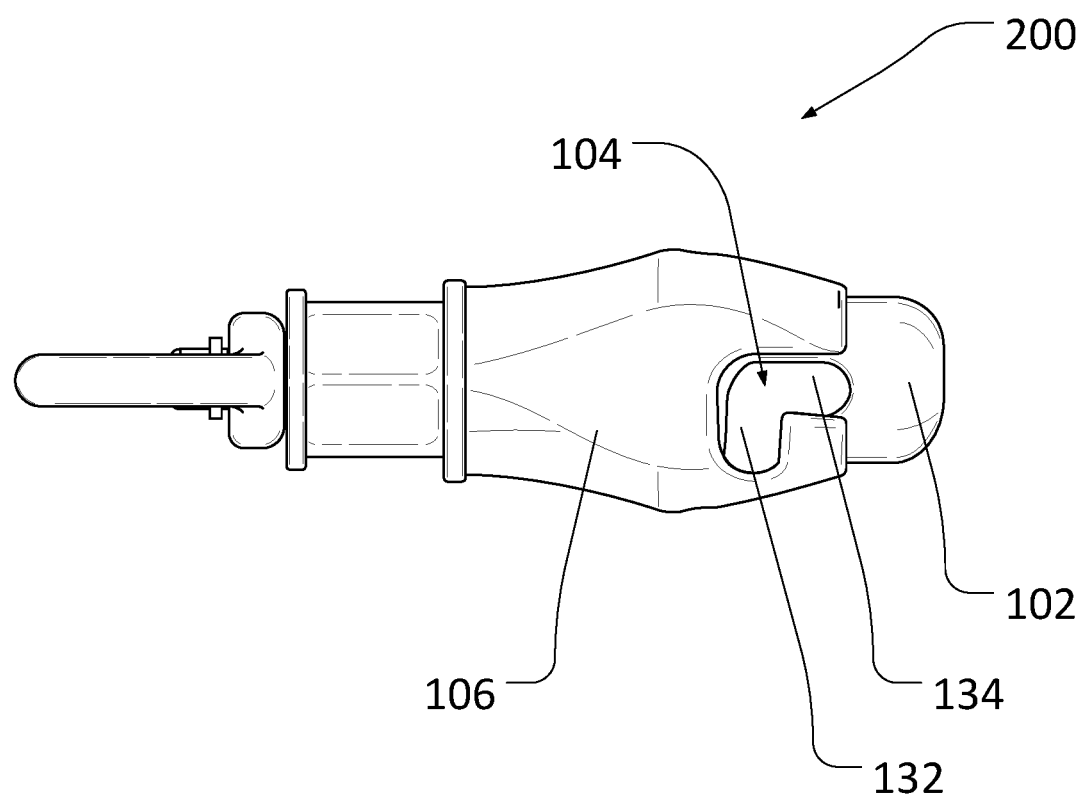
FIG. 20 is a side view of a releasable coupling device with an example alternatively shaped track.

Further, FIG. 20 provides an example illustration of the releasable coupling device 200 comprising an alternatively-shaped track created by a combination of the body 102 and the sleeve 106. Specifically, FIG. 20 illustrates an track of a generally "L"-shaped that clearly defines a first region 132 and a second region 134. Further, the track of FIG. 20 also comprises a step/protrusion 136 which encourages an attachment 108 into one of the first region 132 or the second region 134 upon travelling along the track.

Figure 21:
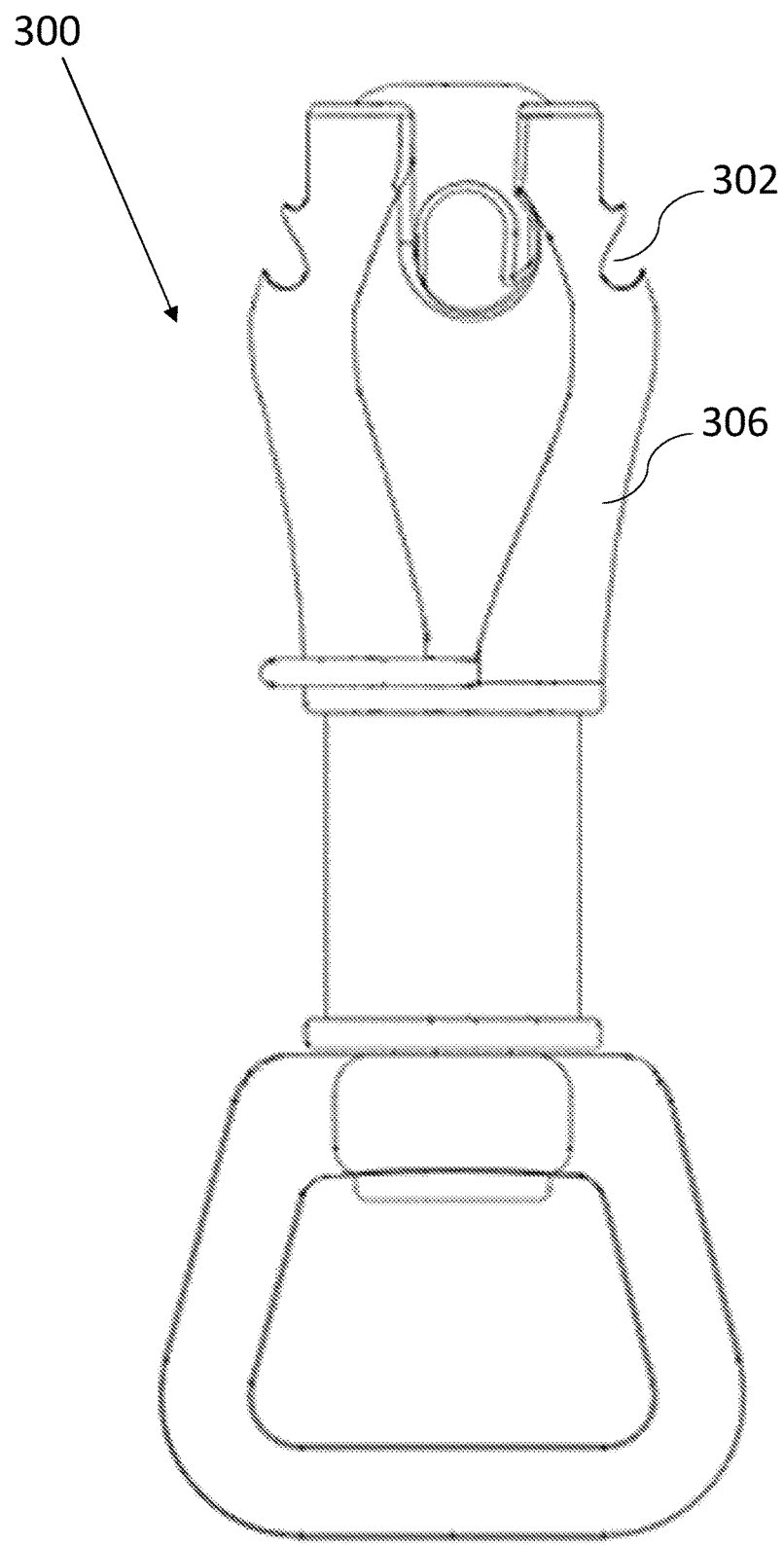
FIG. 21 is a side view of a releasable coupling device with a further exemplary locking system.

FIG. 21 illustrates a further example embodiment of the present disclosure. The sleeve of the releasable coupling device 300 as shown in FIG. 21 comprises a further locking system which may be referred to as a snap retaining ring lock. The snap retaining ring lock is generally located at the distal end of the sleeve. The snap retaining ring lock comprises a groove or recess at the distal end of the sleeve and is configured to at least partially and/or semi-lock the sleeve in place by retaining the ring in the groove or recess.

It will be understood that the disclosure has been described above purely by way of example, and modifications of detail can be made within the scope of the disclosure. Each feature disclosed in the description, and (where appropriate) the claims and drawings may be provided independently or in any appropriate combination.

The invention claimed is:

1. A releasable coupling device comprising:
a body comprising an aperture;
a sleeve positioned at least partially around, and moveable relative to, at least a portion of the body, the sleeve being moveable between an open position in which at least a portion of the aperture is at least partially unoccluded so as to permit coupling of the device to an attachment receivable within the aperture, and a closed position in which at least the portion of the aperture is at least partially occluded so as to resist decoupling of the device by removal of the attachment from the aperture;
the device defining a track configured to guide the attachment receivable within the aperture along a movement path, wherein the track comprises at least a first region, at least partially defined by the sleeve in the closed position, configured to receive the attachment receivable within the aperture, wherein the track further comprises at least a second region configured to receive the attachment receivable within the aperture, wherein the track comprises at least one step or protrusion between the first region and the second region, and wherein at least a portion of a transition portion between the first region and the second region comprises at least one inclined portion.

2. The releasable coupling device according to claim 1, wherein the sleeve is slidable, relative to the body, along a principal axis of the body.

3. The releasable coupling device according to claim 1, wherein in the closed position, the track is at least partially defined by a portion of the body and at least partially defined by a portion of the sleeve.

4. The releasable coupling device of claim 1, wherein the track is configured to guide the attachment receivable within the aperture between the first region of the track and the second region of the track.

5. The releasable coupling device of claim 4, wherein at least a portion of the track between the first region and the second region is substantially non-linear.

6. The releasable coupling device of claim 1, wherein the first region is configured such that, in the closed position, in an event of a twisting or composite or complex motion of the attachment receivable with the aperture, the sleeve is urgeable by the attachment into the closed position.

7. The releasable coupling device of claim 1, wherein a distal end of the aperture and/or a distal end of the track protrudes beyond a distal end of the sleeve when the sleeve is in the closed position.

8. The releasable coupling device of claim 1, wherein a distal end of the second region of the track at least partially protrudes beyond a distal end of the sleeve when the sleeve is in the closed position.

9. The releasable coupling device of claim 1, wherein a shape and/or geometry of the track is defined in two-dimensional space using a set of cubic Bézier curves.

10. A releasable coupling device comprising:
a body comprising an aperture;
a sleeve positioned at least partially around, and moveable relative to, at least a portion of the body, the sleeve being moveable between an open position in which at least a portion of the aperture is at least partially unoccluded so as to permit coupling of the device to an attachment receivable within the aperture, and a closed position in which at least the portion of the aperture is at least partially occluded so as to resist decoupling of the device by removal of the attachment from the aperture;
the device defining a track configured to guide the attachment receivable within the aperture along a movement path;
a coiled spring configured to urge the sleeve into the closed position, and wherein the coiled spring is locatable within the body;
a slide positioned within the sleeve and slidable relative to the body in contact with the spring; and
a lock for limiting or preventing movement of one or more of the sleeve, the slide and the coiled spring.

11. A releasable coupling device, comprising:
(a) an elongated body with an aperture, penetrating transversely through the elongated body, disposed at a distal end thereof and having an opening to a side of the elongated body in a direction generally perpendicular to a primary axis of the elongated body, wherein the aperture and the distal end of the elongated body define a hook; and
(b) a structural retaining sleeve system including a sleeve, wherein the sleeve has an open distal end with slots opening toward the distal end, and wherein the sleeve fits around the elongated body and is longitudinally adjustable between a closed position, wherein the sleeve is disposed around the hook, the slots are transversely aligned with the aperture, and a covering portion of the sleeve fully covers the opening to the aperture in the side of the elongated body, and an open position, wherein the sleeve is retracted to uncover the opening to the aperture in the side of the elongated body;

(c) wherein, in the closed position, a track is defined by the aperture and the slots such that when viewed from a side, the track includes at least two distinct regions or lobes, each defining a respective primary ring retention area, that are separated by a step or protrusion;

(d) wherein an attachment may be inserted into the aperture while the sleeve is in the open position but retained in the track while the sleeve is in the closed position; and (e) wherein, while retained in the track while the sleeve is in the closed position, the attachment tends to remain in a particular one of the at least two distinct regions or lobes thereof with the step or protrusion providing a physical obstacle to the attachment moving from the particular one of at least two through-hole regions or lobes to another of the at least two through-hole regions or lobes.

12. The releasable coupling device of claim 11, wherein a first region or lobe is defined primarily by inward-facing surfaces of the hook, and wherein a second region or lobe has an end defined primarily by inwardly facing surfaces of the covering portion of the sleeve.

13. The releasable coupling device of claim 12, wherein the step or protrusion is a distinctly protruding or convex surface and is arranged to help retain the attachment in the second region or lobe such that a pull force component exerted by the attachment in a direction toward a proximal end of the elongated body is resisted by the body, and a pull force component exerted by the attachment toward the opening to the aperture is resisted by the covering portion of the sleeve.

14. The releasable coupling device of claim 13, wherein the step or protrusion is defined by surfaces of the covering portion of the sleeve.

15. The releasable coupling device of claim 13, wherein the step or protrusion is defined by surfaces of the hook.

16. The releasable coupling device of claim 13, wherein a shape and/or geometry of the track is defined in two-dimensional space using a set of cubic Bézier curves.

17. The releasable coupling device of claim 12, wherein the structural retaining sleeve system further includes a spring, wherein the sleeve is biased by the spring toward the distal end of the elongated body and into the closed position such that the sleeve is disposed around the hook, and wherein the open position is reached by retracting the sleeve against a force of the spring.

18. The releasable coupling device of claim 12, further comprising a swivel system at a proximal end of the elongated body.

* * * * *